United States Patent [19]

Akkary et al.

[11] Patent Number: 5,671,444

[45] Date of Patent: Sep. 23, 1997

[54] METHODS AND APPARATUS FOR CACHING DATA IN A NON-BLOCKING MANNER USING A PLURALITY OF FILL BUFFERS

[75] Inventors: Haitham Akkary, Portland; Jeffrey M. Abramson, Aloha; Andrew F. Glew, Hillsboro; Glenn J. Hinton, Portland; Kris G. Konigsfeld, Portland; Paul D. Madland; Mandar S. Joshi, both of Beaverton; Brent E. Lince, Hillsboro, all of Oreg.

[73] Assignee: Intel Corporaiton, Santa Clara, Calif.

[21] Appl. No.: 731,545

[22] Filed: Oct. 15, 1996

Related U.S. Application Data

[63] Continuation of Ser. No. 202,448, Feb. 28, 1994, abandoned.

[51] Int. Cl.$^6$ .................................................. G06F 13/00
[52] U.S. Cl. ........................ 395/872; 395/447; 395/403; 395/449; 395/451
[58] Field of Search ...................................... 395/403, 427, 395/464, 468, 800, 872, 449, 451, 473, 479, 447

[56] References Cited

U.S. PATENT DOCUMENTS

| 5,317,718 | 5/1994 | Jouppi | 395/464 |
|---|---|---|---|
| 5,367,660 | 11/1994 | Gat et al. | 395/403 |
| 5,371,870 | 12/1994 | Goodwin et al. | 395/872 |
| 5,379,396 | 1/1995 | Gochman et al. | 395/468 |
| 5,430,888 | 7/1995 | Witek et al. | 395/800 |
| 5,446,863 | 8/1995 | Stevens et al. | 395/427 |

*Primary Examiner*—Tod R. Swann
*Assistant Examiner*—James Peikari
*Attorney, Agent, or Firm*—Blakely, Sokoloff, Taylor & Zafman

[57] ABSTRACT

A data cache and a plurality of companion fill buffers having corresponding tag matching circuitry are provided to a computer system. Each fill buffer independently stores and tracks a replacement cache line being filled with data returning from main memory in response to a cache miss. When the cache fill is completed, the replacement cache line is output for the cache tag and data arrays of the data cache if the memory locations are cacheable and the cache line has not been snoop hit while the cache fill was in progress. Additionally, the fill buffers are organized and provided with sufficient address and data ports as well as selectors to allow the fill buffers to respond to subsequent processor loads and stores, and external snoops that hit their cache lines while the cache fills are in progress. As a result, the cache tag and data arrays of the data cache can continue to serve subsequent processor loads and stores, and external snoops, while one or more cache fills are in progress, without ever having to stall the processor.

39 Claims, 15 Drawing Sheets

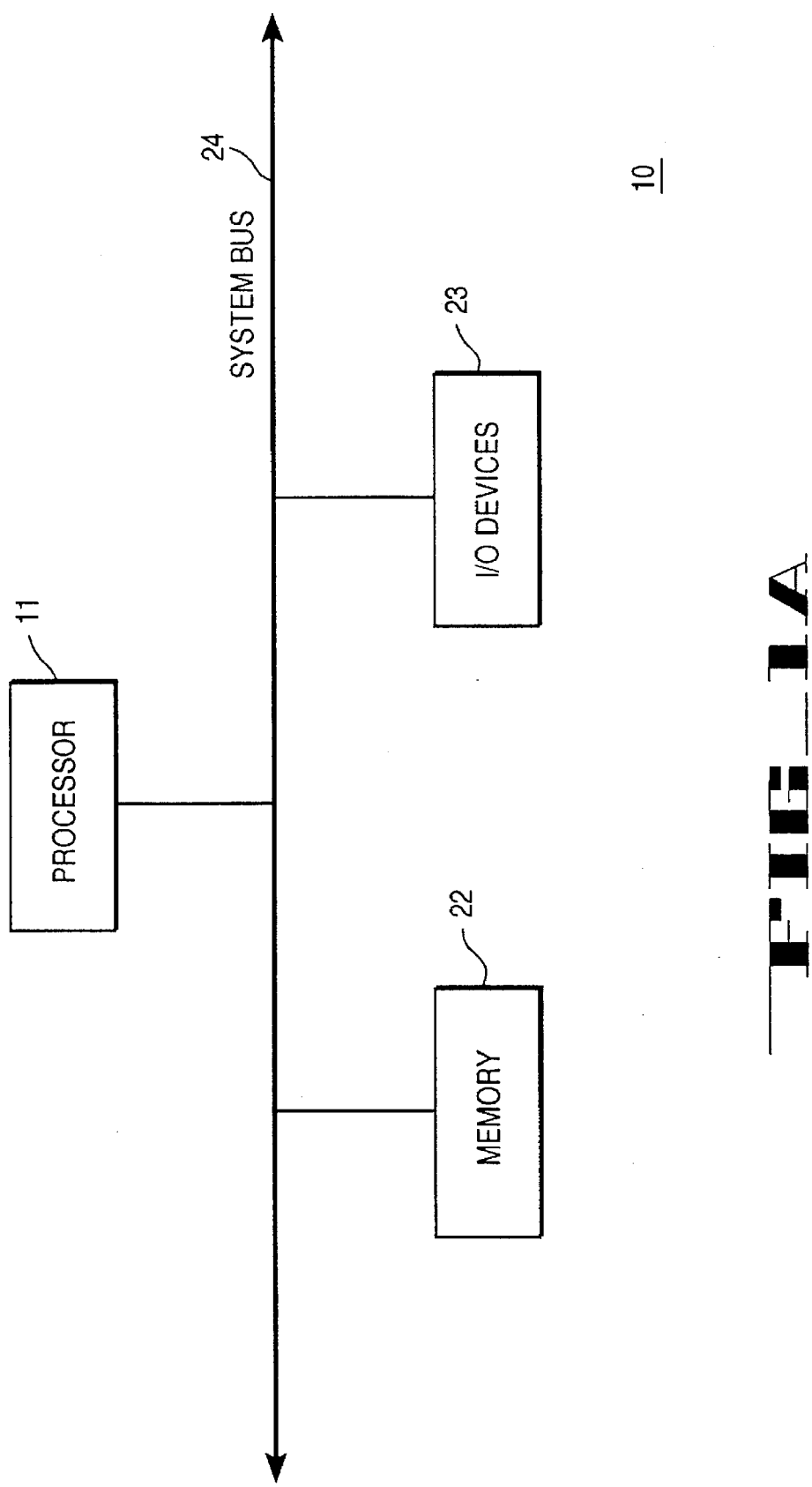

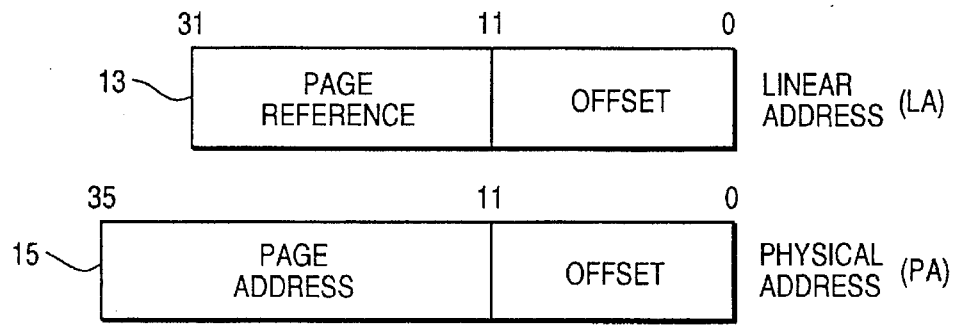
FIG_1B
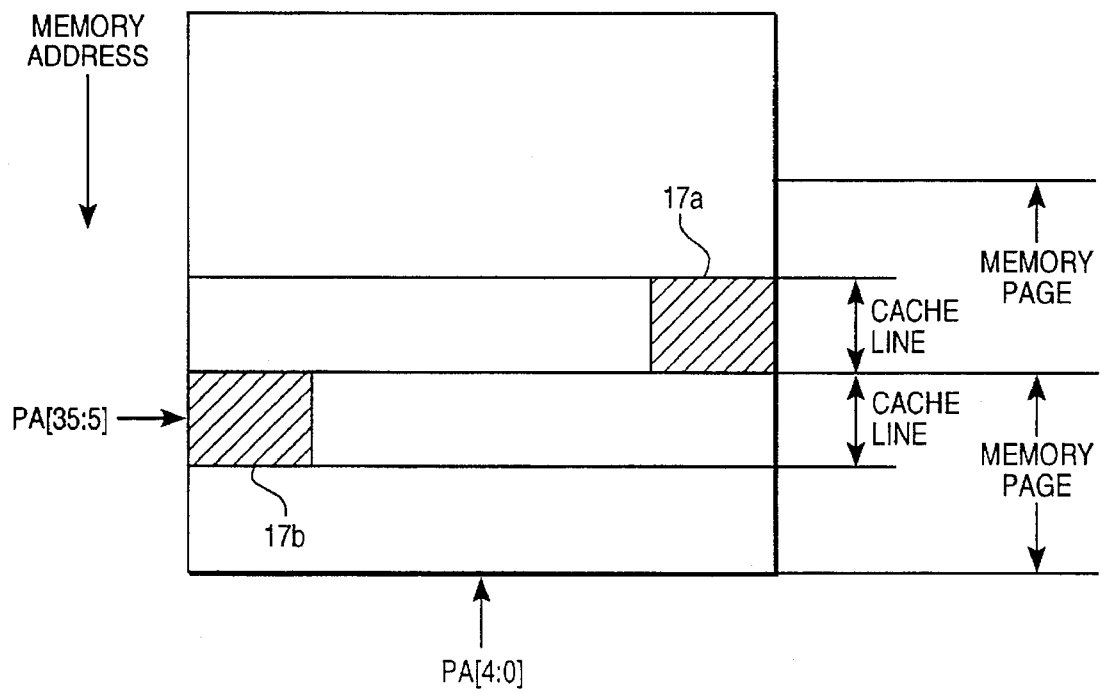
FIG_1C

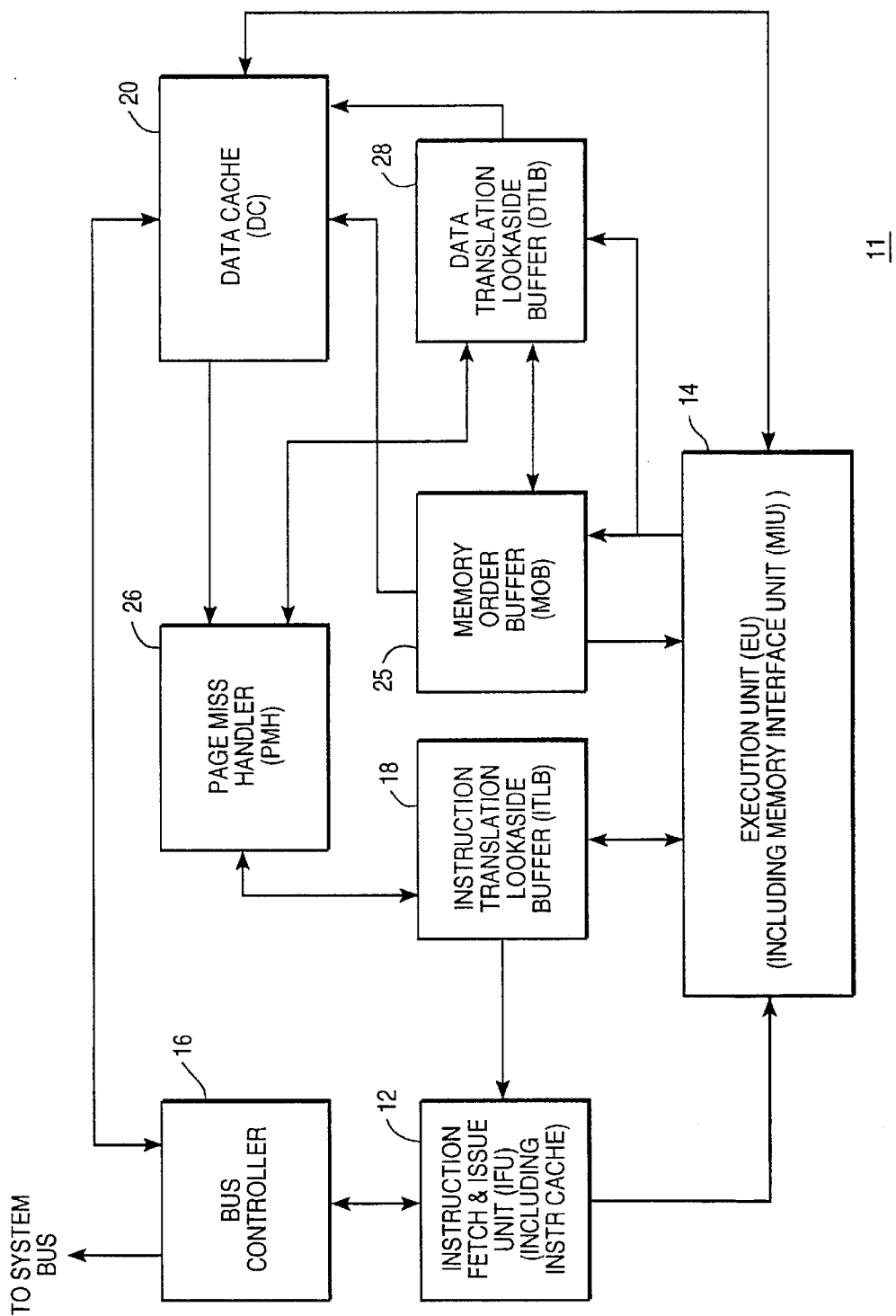

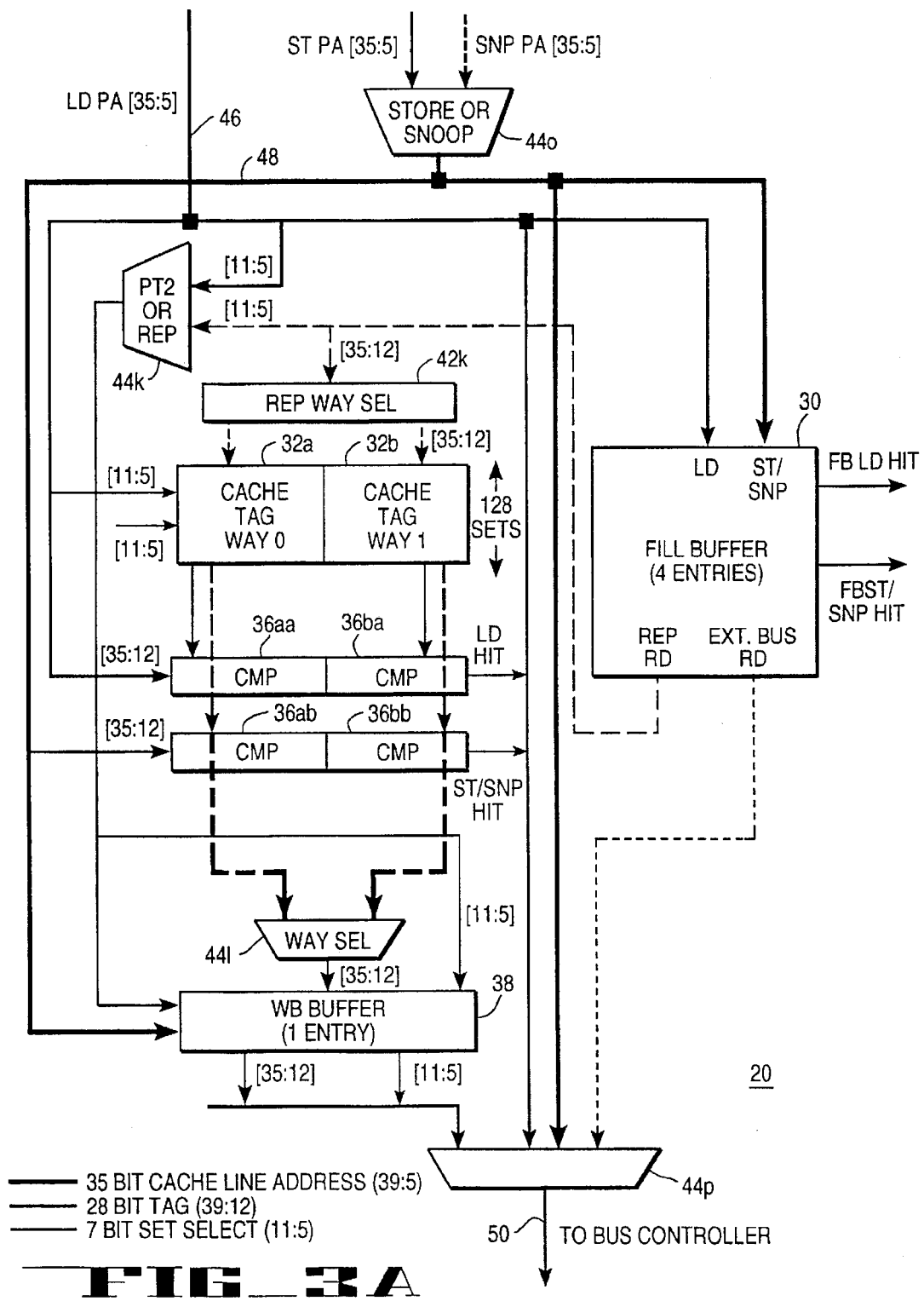
FIG_3A

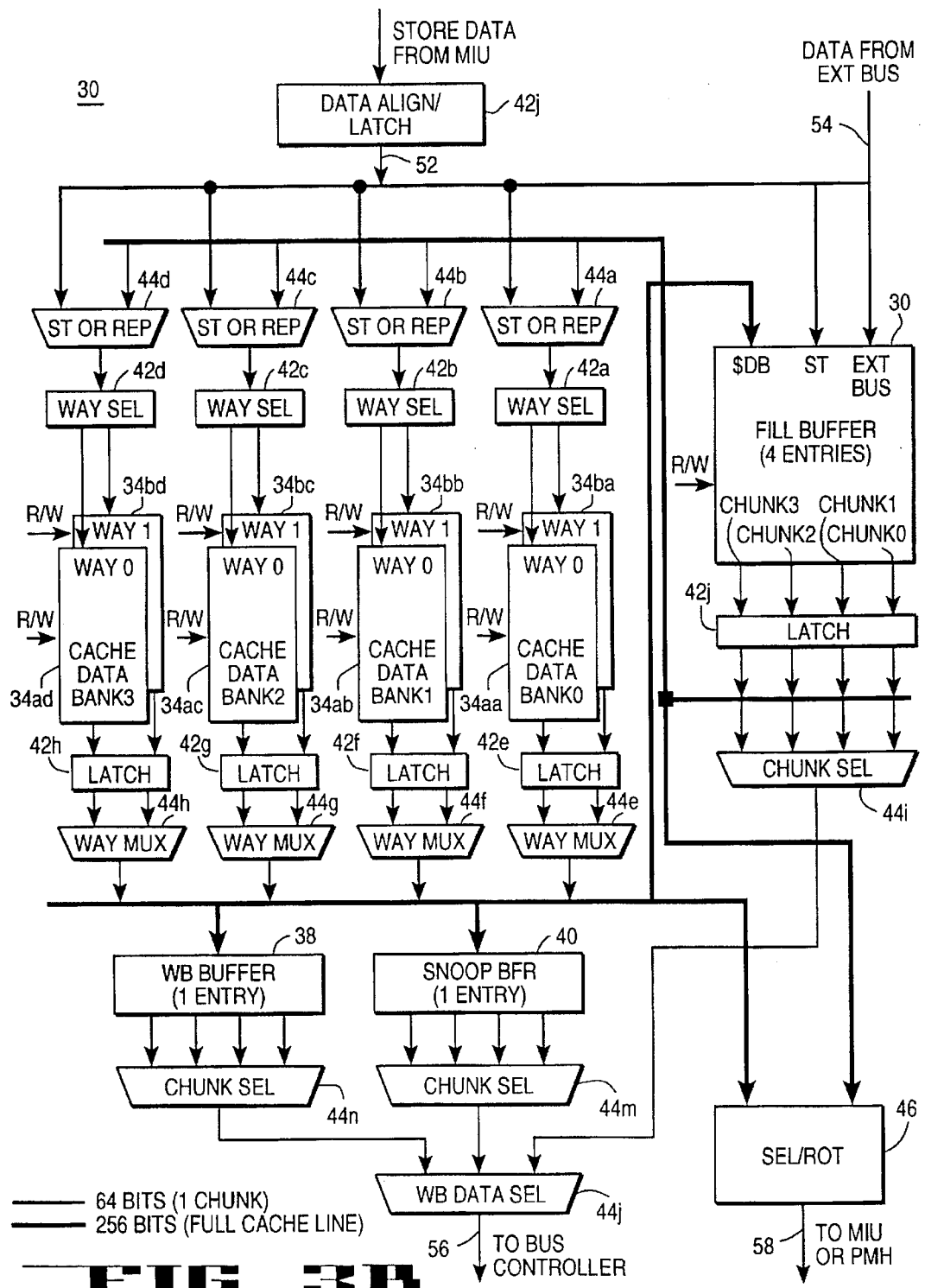
FIG_3B

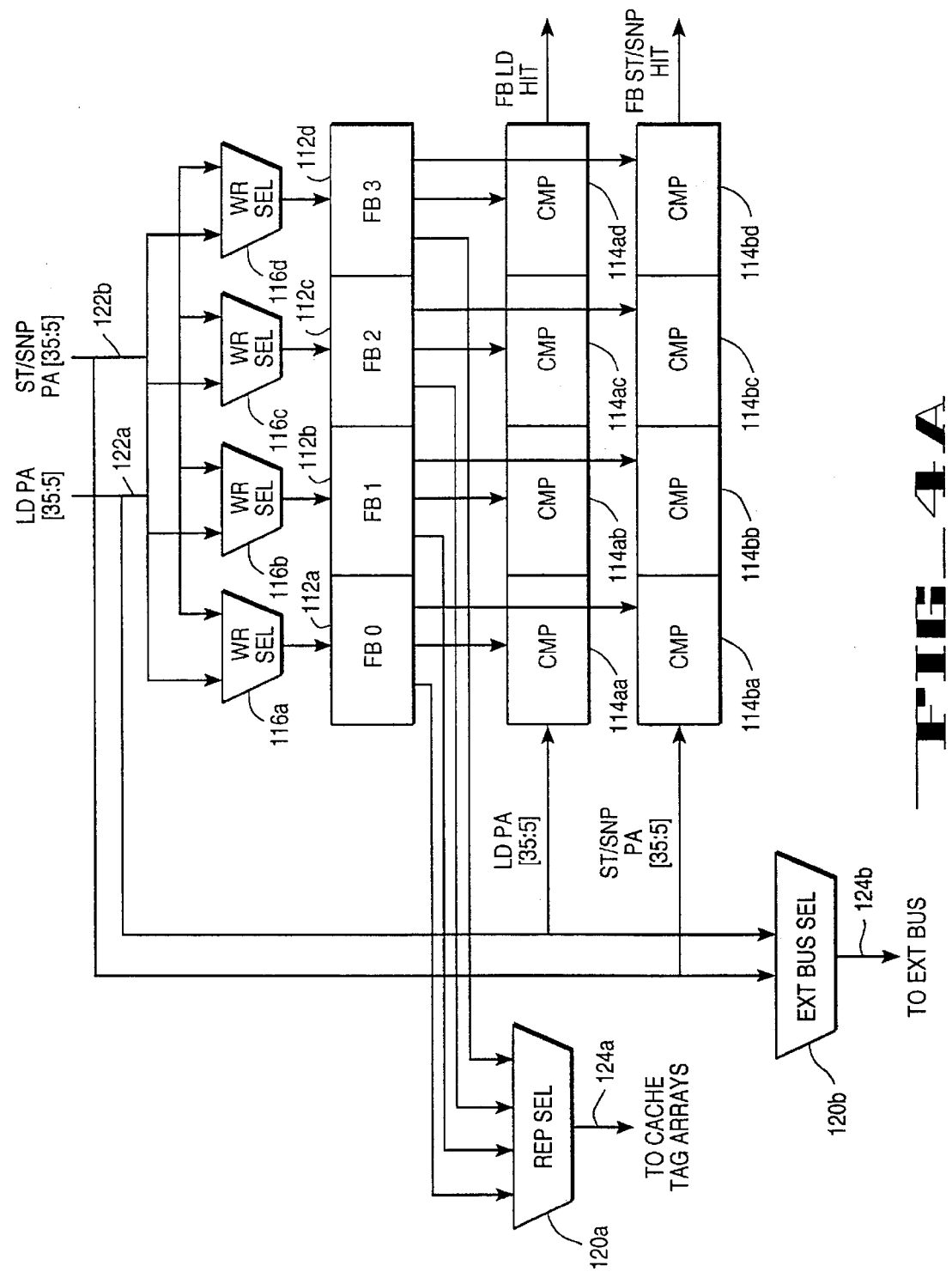
FIG_4A

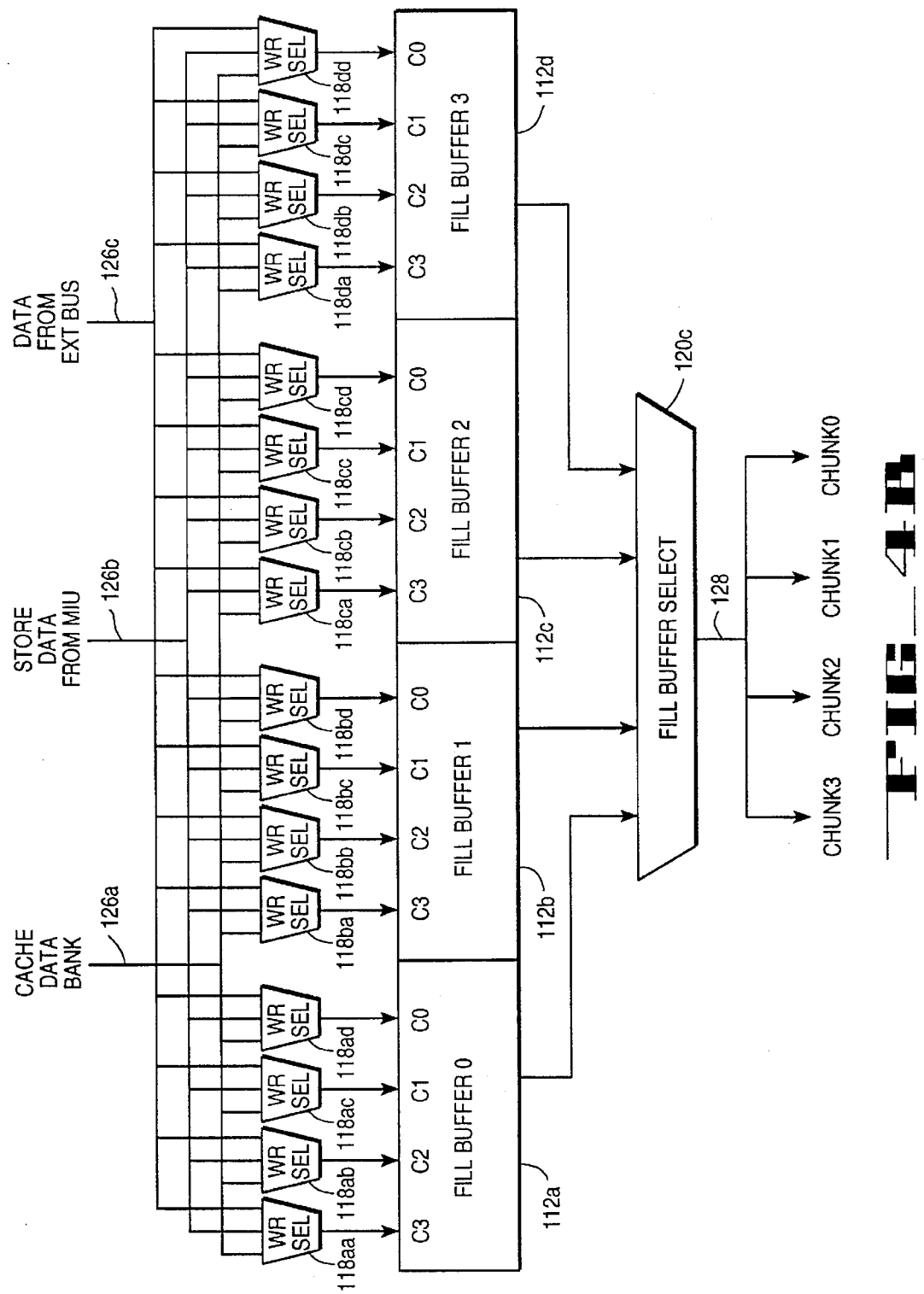
FIG.—4B

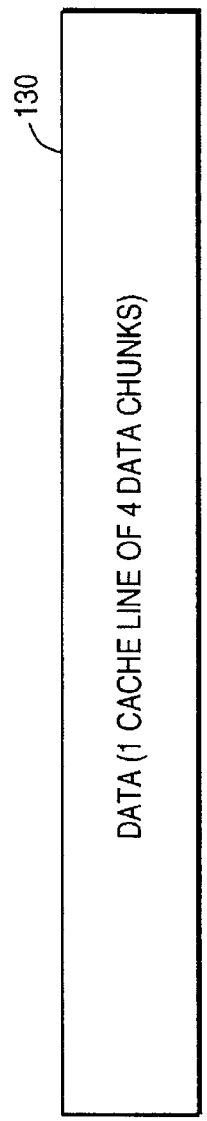
FIG_5

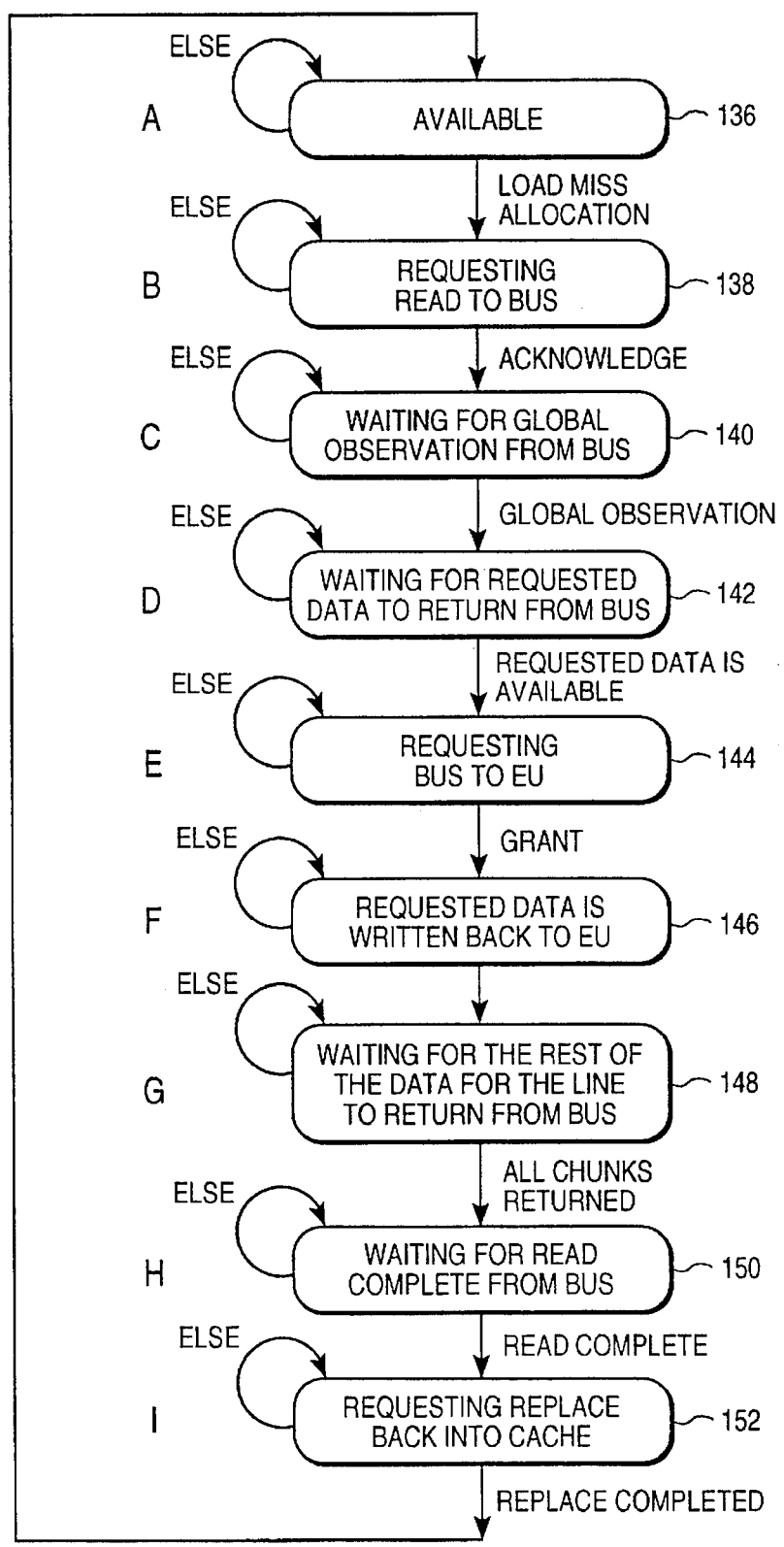
FIG_7A

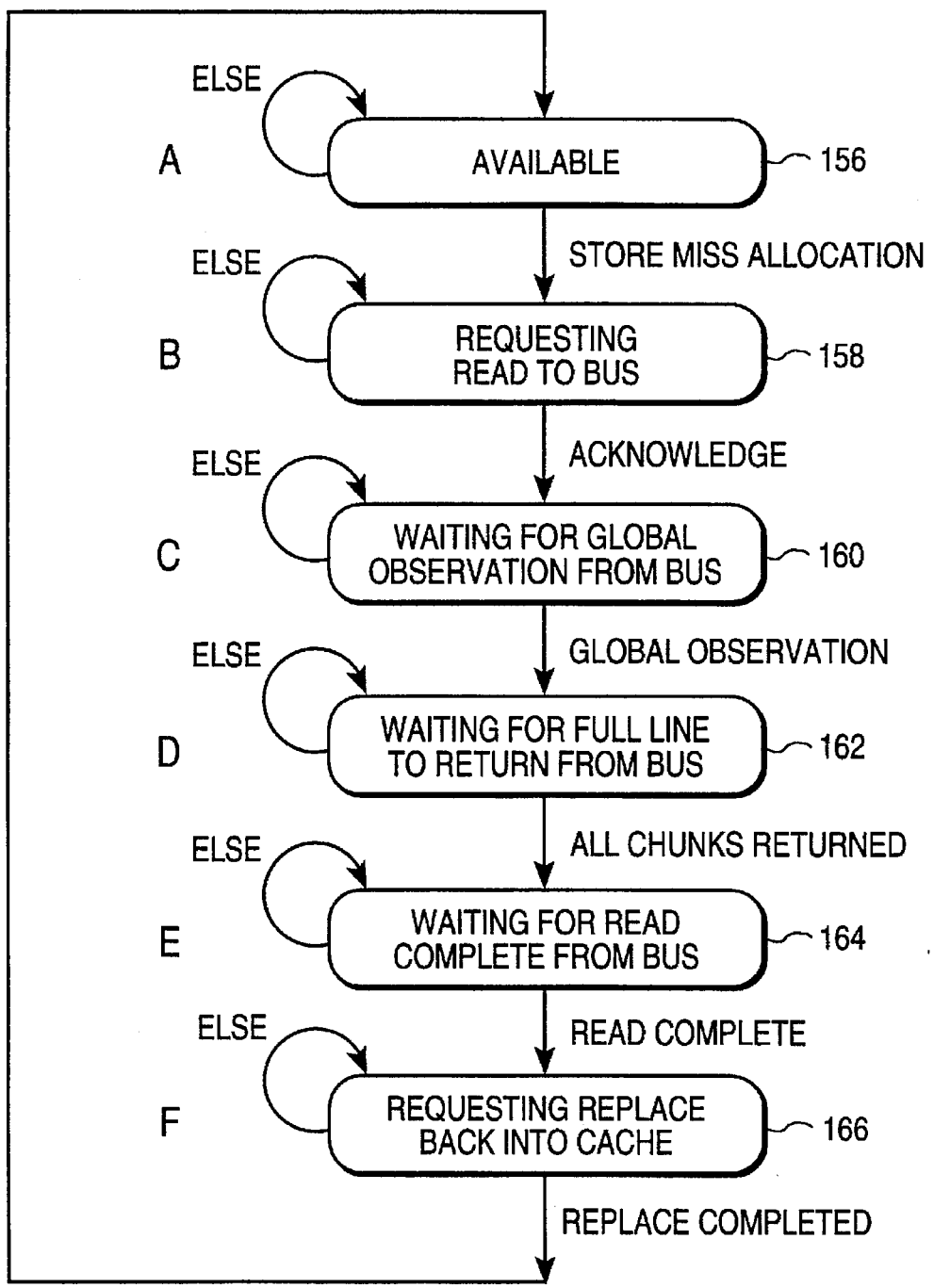
FIG_7B

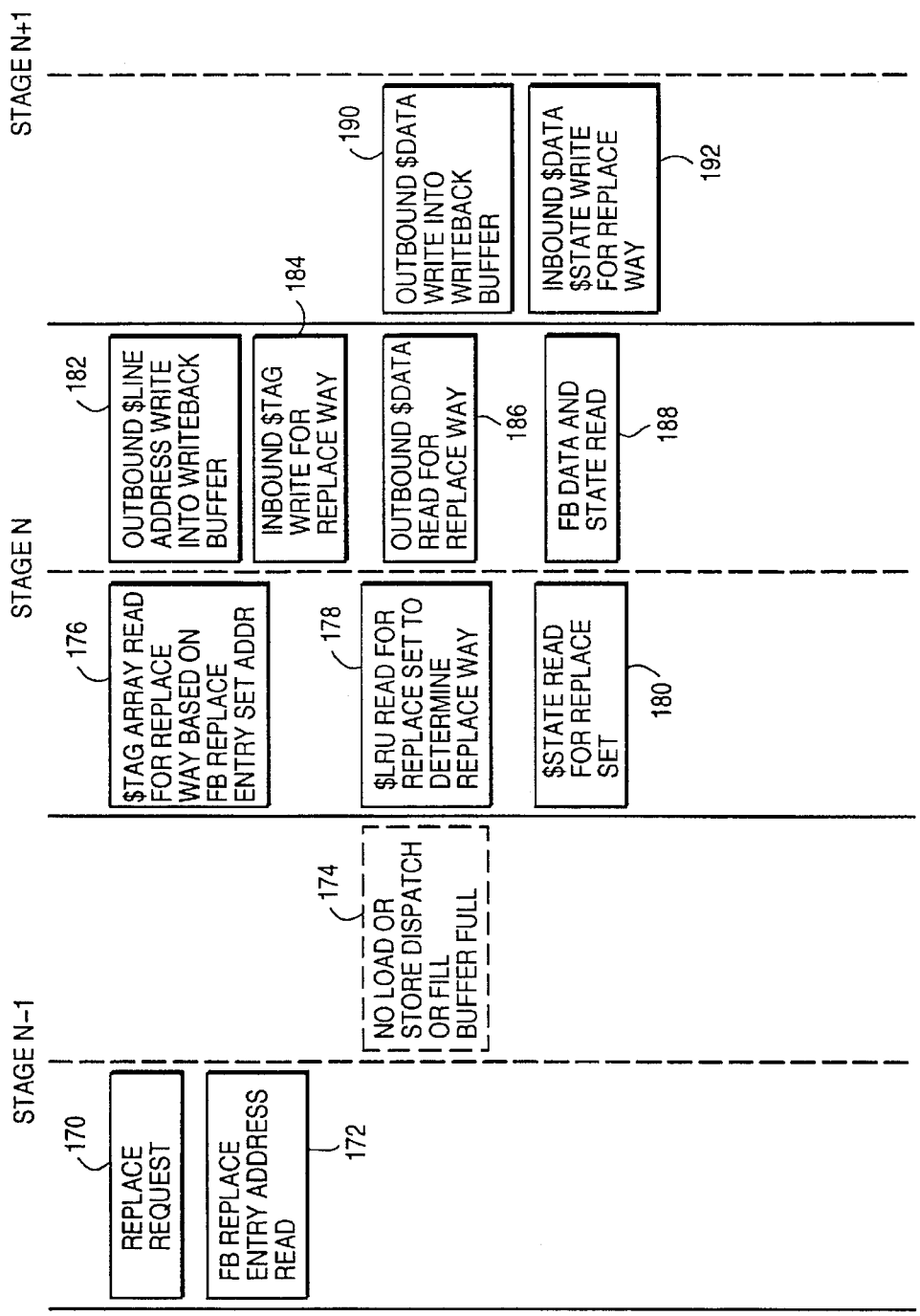

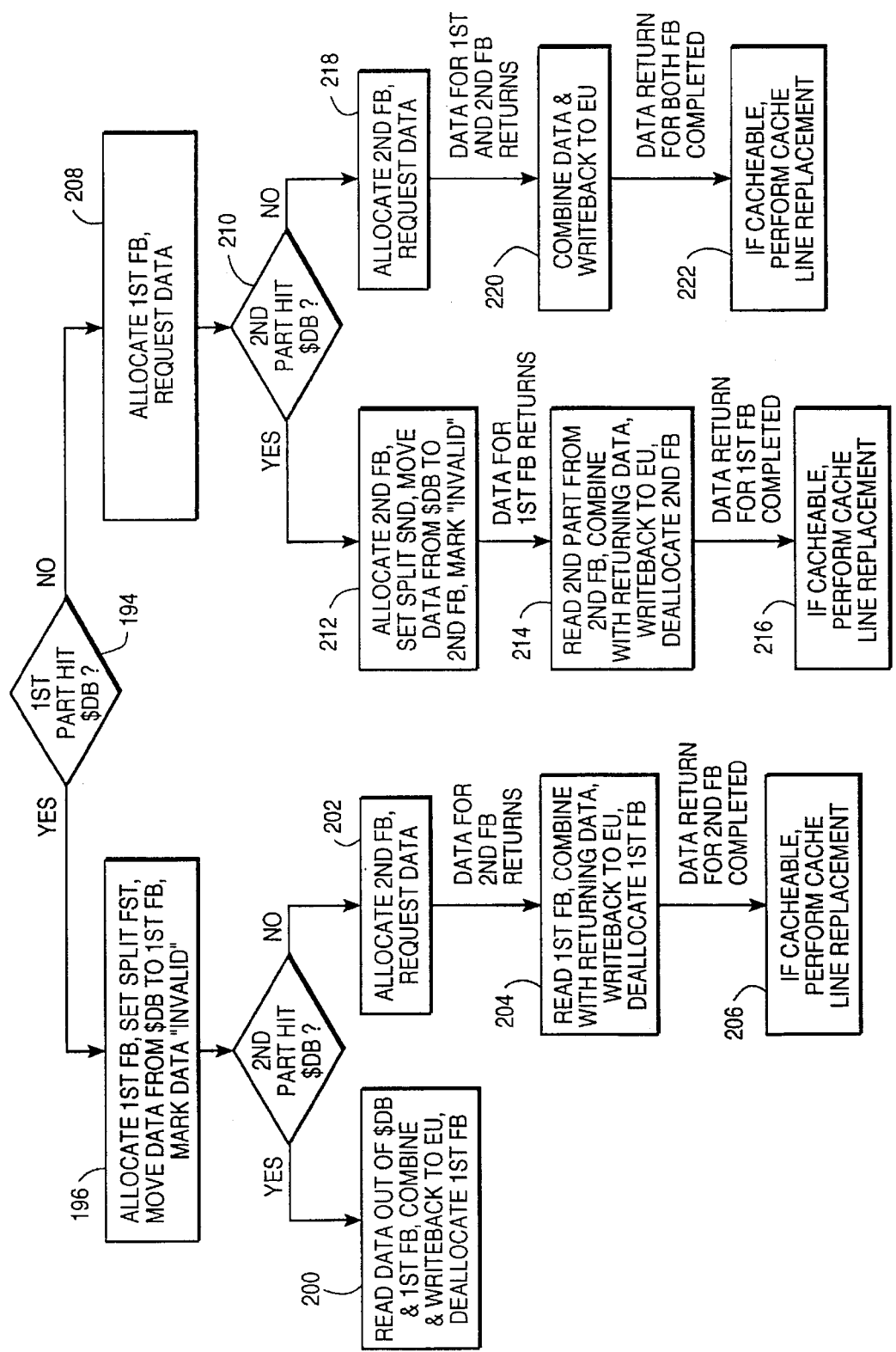
FIG_9

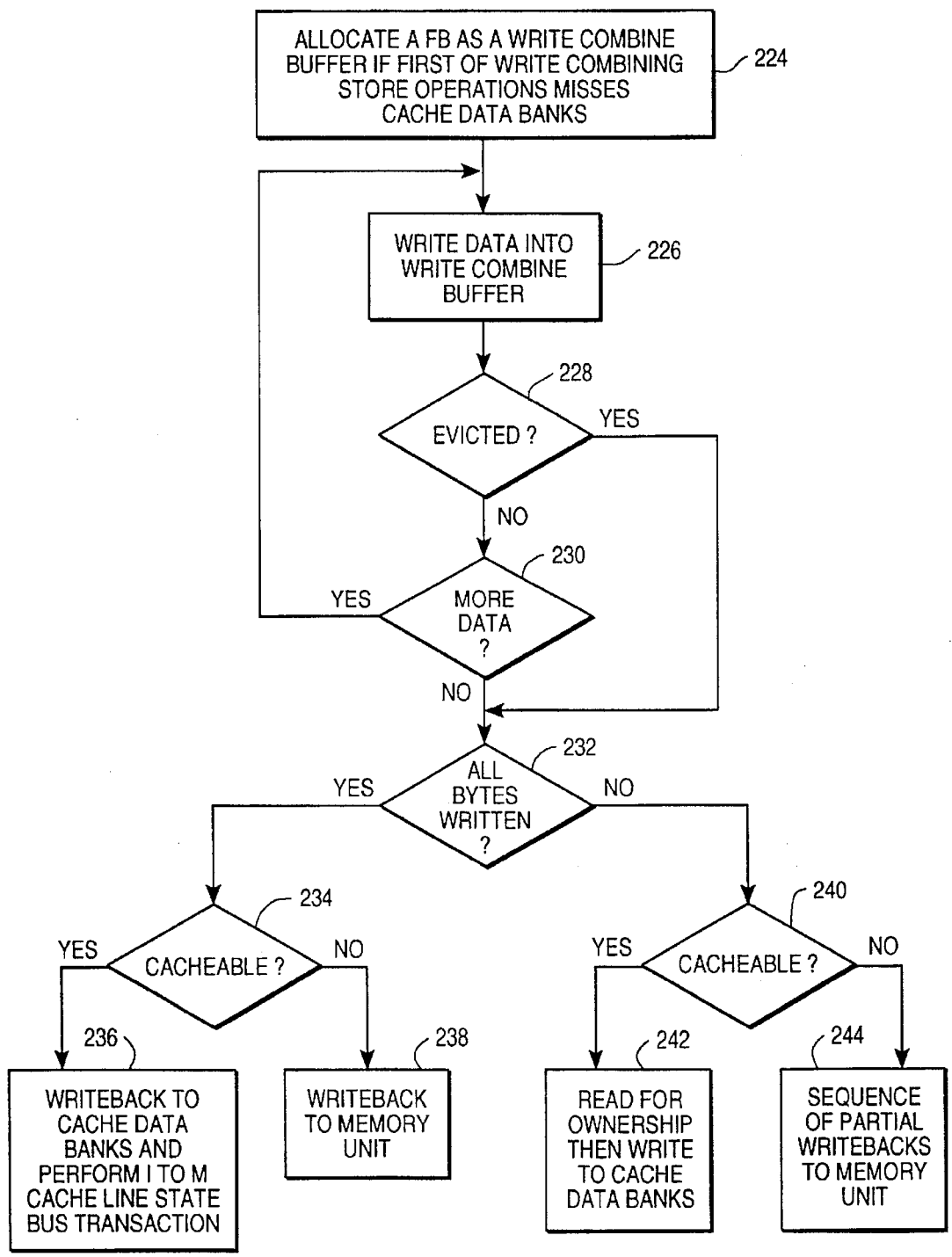
FIG_10

METHODS AND APPARATUS FOR CACHING DATA IN A NON-BLOCKING MANNER USING A PLURALITY OF FILL BUFFERS

This is a continuation of application No. 08/202,448, filed Feb. 28, 1994, now abandoned.

BACKGROUND OF THE INVENTION

1. Field of the Invention

The present invention relates to the field of computer systems. More specifically, the present invention relates to the handling of cache misses when accessing cache memory subsystems of computer systems.

2. Background

Today, for the purpose of improving system performance, most computer systems employ cache memory subsystems to speed up data retrieval from main memory for the central processing units (CPUs). As is well known in the art, a cache miss is encountered when the memory locations referenced by a CPU read/write are not in the cache memory. Except for a write without allocate implementation for handling write cache misses, the cache subsystem is refreshed or refilled with a new cache line of data brought in from the main memory, including those memory locations referenced by the CPU. Except at initialization, the new cache line replaces an existing cache line which is deallocated, and for a write back implementation, the "dirty" data of the "victimized" cache line are written back into the main memory.

Historically, the CPU is stalled when a cache fill is in progress, i.e., when the new cache line is being brought into the cache memory from main memory, resulting in performance penalty. The performance penalty of cache misses has always been a concern of computer system designers, leading to the development of various optimization techniques to reduce the likelihood of cache misses, and handling techniques to reduce the cost of each cache miss. One example of handling technique is out-of-order returning of data from main memory, whereby the data requested is returned first and by-passed to the CPU to allow the CPU to continue execution earlier. Another example of handling technique is data streaming, whereby the fill status of individual data bytes of the cache line are monitored and filled data are returned during "dead" cycles to satisfy successive CPU reads of the same cache line.

However, the problem is never totally solved with the ever increasing CPU processing speed. What was once considered negligible or acceptable level of cache miss penalty in a predecessor generation of machines often becomes unacceptable for the successor generation. With the advent of out-of-order execution processors, where instructions are dispatched for execution out-of-order and perhaps even speculatively as long as their operand dependencies are resolved, it has become particularly desirable for the cache subsystem to be able to continue to serve subsequent CPU references to virtually any memory locations while a cache fill is in progress, without stalling the CPU at all.

As will be disclosed in more detail below, the present invention advantageously achieves these and other desirable results.

SUMMARY OF THE INVENTION

Under the present invention, the desirable results are advantageously achieved by providing a data cache and a plurality of companion fill buffers having corresponding tag matching circuitry. Each fill buffer independently stores and tracks a missed cache line being filled with data returning from main memory in response to a cache miss. When the cache fill is completed, the fill completed cache line is output for the cache tag and data arrays of the data cache if the memory locations are cacheable and the cache line has not been snoop hit while the cache fill was in progress. Additionally, the fill buffers are organized and provided with sufficient address and data input ports as well as sufficient address and data write selectors to allow the fill buffers to respond to subsequent processor loads and stores, and external snoops that hit their cache lines while the cache fills are in progress. As a result, the cache tag and data arrays of the data cache can continue to serve subsequent processor loads and stores, and external snoops, while one or more cache fills are in progress, without ever having to block or stall the processor.

In the presently preferred embodiment, the fill buffers comprise four buffer slots organized in a fully associative manner. Furthermore, the fill buffers are provided with two address input ports, two address output ports, three data input ports, one data output port, four address write selectors and sixteen data write selectors. The two address input ports and the four address write selectors facilitate concurrent input and writing of the addresses of two cache lines missed by a load and a store/snoop operation. The two address output ports facilitate concurrent output of the address of a missed cache line for the main memory to initiate a cache fill for the missed cache line, and the address of a replacement cache line for the data cache. The three data input ports and the sixteen data write selectors facilitate concurrent input and writing of data chunks returning from the main memory, data chunks being written by a store operation, and data chunks being output by the data cache. Lastly, the data output port facilitates output of either a replacement cache line for the data cache or data chunks for a load operation.

BRIEF DESCRIPTION OF THE DRAWINGS

FIGS. 1A, 1B and 1C illustrate an exemplary computer system incorporating the teachings of the present invention, including addressing, and data boundary misalignment on the exemplary computer system.

FIG. 2 illustrates the relevant portions of one embodiment of the processor of FIG. 1A in further detail.

FIGS. 3A–3B illustrate the relevant portions of one embodiment of the data cache of FIG. 2 in further detail from the address and data path views.

FIGS. 4A–4B illustrate the relevant portions of one embodiment of the fill buffers of FIGS. 3A–3B in further detail from the address and data path views.

FIGS. 6A–6B illustrate the basic operational steps of the data cache of FIG. 2 for loading and storing data.

FIGS. 7A–7B illustrate the operational states of a fill buffer slot of FIGS. 4A–4B during a load and a store cache miss.

FIG. 8 illustrates the operational steps of a fill buffer slot of FIGS. 4A–4B for replacing a cache line.

FIG. 9 illustrates the operational steps of a fill buffer slot of FIGS. 4A–4B for servicing the aligned subset load operations of a misaligned load operation.

FIG. 10 illustrates the operational steps of a fill buffer slot of FIGS. 4A–4B for servicing a sequence of write combining store operations.

DETAILED DESCRIPTION

Figure 5A:
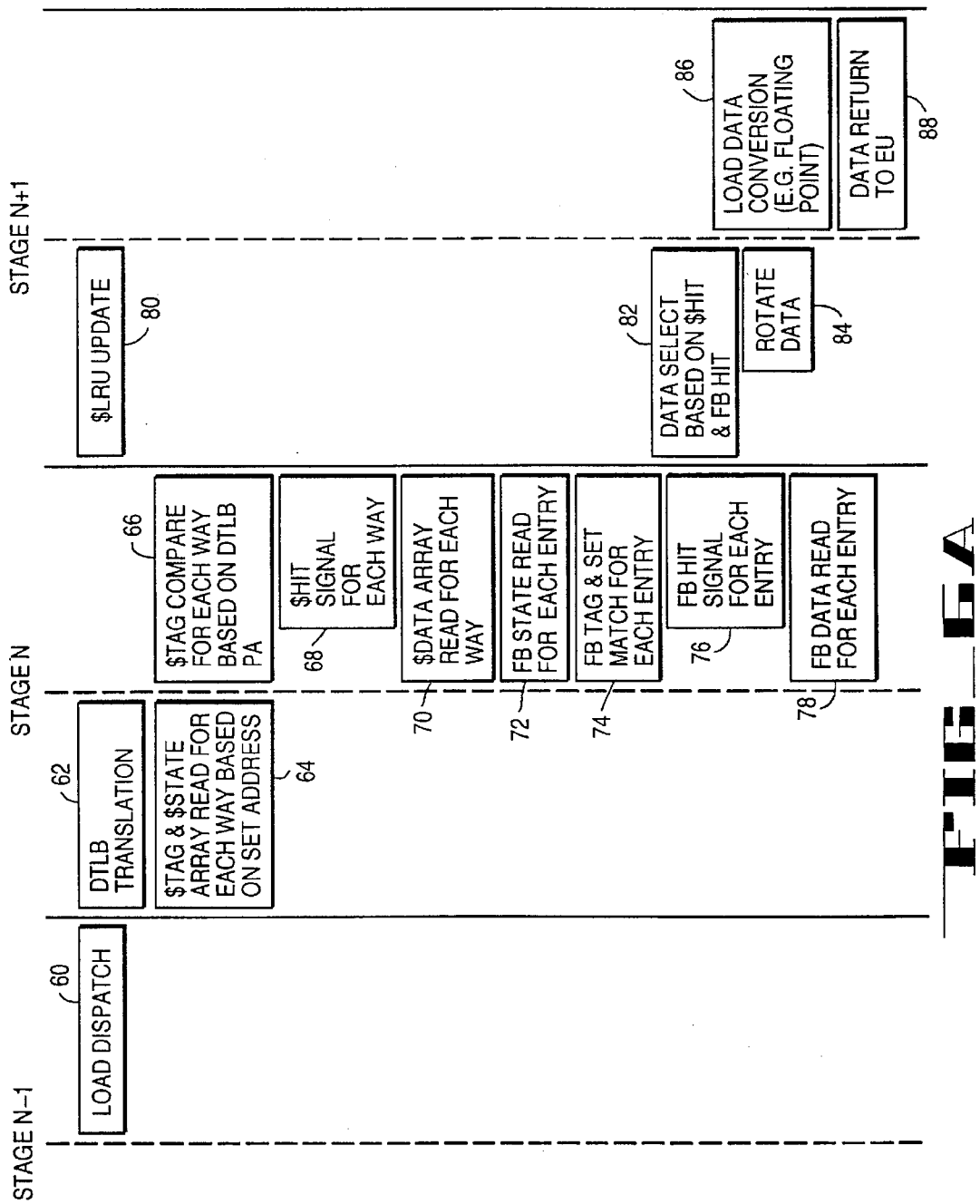
FIG. 5 illustrates the relevant contents of one of the fill buffer slots of FIGS. 4A–4B in further detail.

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily. For ease of explanation, unless otherwise stated, the terms data load and store operations in the description to follow are intended to mean memory data load and store operations.

Referring now to FIGS. 1a–1c, three block diagrams illustrating an exemplary computer system incorporating the teachings of the present invention are shown. Illustrated in FIG. 1a is the exemplary computer system 10 comprising a processor 11, a memory unit 22, a number of I/O devices 23, and a system bus 24, coupled to each other as shown. As will be described in further detail below, the processor 11 comprises an internal non-blocking data cache (DC) 20 of the present invention (see FIGS. 2). In the presently preferred embodiment, the processor 11 including its internal non-blocking DC 20 is disposed on a single silicon based chip. Notwithstanding the DC 20 as being illustrated as an integral part of the processor 11, for the purpose of this disclosure, the term memory subsystem includes the DC 20 as well as the memory unit 22. Additionally, the term non-blocking cache is intended to mean that the processor 11 is not stalled even if a cache miss is encountered while accessing the DC 20.

The exemplary computer system 10 supports virtual address spaces comprising memory locations of the memory unit 22 and the addresses of the I/O devices 23, which are partitioned into memory pages and organized into memory segments. During program execution, memory space locations are referenced by instructions, including load and store instructions, using linear addresses, which in turn get translated into physical addresses. A linear address is computed using a base address, a displacement value, a scale value, an index value, and a segment value. As illustrated in FIG. 1b, a linear address 13 comprises a translated portion which identifies a memory page, and an untranslated portion which identifies the offset into the memory page. Correspondingly, a physical address 15 comprises the translated portion of the linear address locating the memory page, and the untranslated portion of the linear address locating the offset into the memory page. In one embodiment, a linear address 13 is 32 bits long with the 20 higher order bits getting translated, and the 12 lower order bits untranslated. A physical address 15 is 36 bits long with the 24 higher order bits being the translated portion, and the 12 lower order bits being the untranslated portion of the linear address.

As illustrated in FIG. 1c, loading and storing data 17a and 17b from and to memory space locations are not required to be data boundary aligned. In other words, load and store data 17a and 17b may be split for example over two data chunks, two cache lines, as well as two memory pages. As illustrated, load and store data 17a and 17b that are memory page split misaligned are by definition cache line split misaligned. Similarly, load and store data 17a and 17b that are cache line split misaligned are by definition data chunk split misaligned. In one embodiment, a memory page is 4K bytes, a cache line is 32 bytes, and a data chunk is 8 bytes.

Except for the teachings of the present invention incorporated in the processor 11, the elements 11, 22–24, are intended to represent a broad category of processors, memory units, I/O devices, and system buses found on many computer systems. Their basic functions and constitutions are well known, thus will not be otherwise further described. The non-blocking cache 20 of the present invention and its operations will be described in further detail below with additional references to the remaining figures.

While for ease of understanding, the present invention is being described with the exemplary computer system 10 illustrated in FIGS. 1a–1c, based on the description to follow, it will be appreciated that the present invention may be practiced on other computer systems configured in other manners, having different addressing mechanisms, and/or different data boundary alignments. In particular, the computer system 10 may include additional processors, i.e. a multi-processor system. Furthermore, the functions of the processor 11 may be disposed on one or more chips, fabricated using silicon or other equivalent semiconductor materials.

Referring now to FIG. 2, a block diagram illustrating the out-of-order (OOO) execution processor 11 of FIG. 1a in further detail is shown. As illustrated, the processor 11 comprises an instruction fetch and issue unit (IFU) 12, an OOO execution unit (EU) 14, a bus controller 16, an instruction and a data translation lookaside buffer (ITLB and DTLB) 18 and 28, a page miss handler (PMH) 26, a memory order buffer (MOB) 25 and a data cache (DC) 20, coupled to each other as shown. The IFU 12 includes an instruction cache (not shown), and the EU 14 includes a memory interface unit (MIU) (not shown). The DC 20 comprises a number of fill buffers 30 (see FIG. 3a–3b). The MOB 25, the DTLB 28, the PMH 26, and the MIU 34 collectively serve as the memory order interface (MOI) components interfacing between the rest of the EU 14 and the memory subsystem, i.e. the DC 20 and the memory unit 22. The DC 20 and the memory unit 22 are coupled to each other through the bus controller 16 and the system bus 24. Together they cooperate to fetch, issue, execute, and save execution results of instructions in a pipelined manner.

The IFU 12 fetches instructions from the memory unit 22 through the bus controller 16 and the system bus 24, stores them in the instruction cache, and issues them in program order to the execution unit 14 for execution. Some instructions are fetched and issued speculatively. The EU 14 executes the instructions as soon as their operand dependencies on execution results of preceding instructions are resolved, including those instructions that are speculatively fetched and issued. In other words, the instructions are not necessarily executed in the order they were issued, and some instructions are speculatively executed. However, the execution results are retired or committed to processor states in order, and speculative execution results of mis-predicted branches are purged. For the purpose of this disclosure, data in processor states means the data are valid and available to other processor components external to the EU 14.

The address portions of the stores are dispatched from the EU 14 to the MOB 25 and the DTLB 28, whereas the data portions of the stores are buffered in the MIU 34. In due course, unless purged, both the address and data portions are dispatched from the MOB 25 and the MIU of the EU 14 to the DC 20. Similarly, the address portions of the loads are dispatched from the EU 14 to the MOB 25. In due course, unless purged, the address portions are dispatched either to the DC 20 or to the MIU of the EU 14 (for buffered store forwarding). The retrieved data are saved in the EU 14, and in due course, unless purged, are retired/committed to processor states.

As described earlier, both the instruction cache of the IFU 12 and the data cache 20 are physically addressed. The ITLB 18 and the DTLB 28, among other functions, are used to translate the accessing linear addresses that are currently cached into physical addresses through table lookups, provide memory types for the physical addresses, and perform a number of fault detections. The PMH 26 is used to handle page misses in both the instruction cache of the IFU 12, and the data cache 20, which includes among other functions, translation of page missed linear addresses into physical addresses, determination of memory types for the page missed physical addresses, and causing the allocation and filling of cache lines.

For a more detailed description of executing a store operation as two independent STA and STD operations, see copending U.S. patent application, Ser. No. 08/17,250, entitled Method and Apparatus For Performing Store Operations, filed Jan. 4, 1994. For a more detailed description of forwarding buffered store data for load operations, see copending U.S. patent application, Ser. No. 08/176,111, entitled Method and Apparatus For Forwarding Buffered Store Data In An Out-Of-Order Execution Computer System, filed on Dec. 30, 1993. For a more detailed description of loading and storing misaligned data, see issued U.S. Pat. No. 5,577,200, based on U.S. patent application Ser. No. 08/550,573, entitled "Method and Apparatus For Loading And Storing Misaligned Data On An Out-of-order Execution Computer System", which was in turn based on abandoned patent application Ser. No. 08/202,445. All of the above identified U.S. patent applications are assigned to the assignee of the present invention, and are hereby fully incorporated by reference.

The IFU 12, the ITLB 18, and the bus controller 16 are intended to represent a broad category of these elements found in many computer systems. Their functions and constitutions are well known and will not be further described. The execution unit 14, the MOB 25, the DTLB 28, and the PMH 26 are also intended to represent a broad category of these elements found in computer systems including but not limited to those described in the above identified copending U.S. Patent Applications.

The fill buffers 30 including their operations as well as the DC 20 will be described in further detail below. However, before these discussions, it should be noted that while the present invention is being described with an out-of-order execution processor 11, based on the descriptions to follow, it will be appreciated that the present invention may be practiced with in-order as well as out-of-order execution processors.

Referring now to FIGS. 3a–3b, an address path and a data path view illustrating the relevant portions of one embodiment of the data cache 20 of FIG. 2 are shown. Illustrated is an embodiment of the DC 20 which is a physically addressed 2-way set associate cache having 128 sets of cache lines. However, based on the descriptions to follow, it will be appreciated that the present invention may be practiced with other associative or non-set associative cache mapping.

As illustrated, the DC 20 comprises two cache tag arrays 32a–32b, one for each way, eight cache data banks 34aa–34ad and 34ba–34bd, four for each way, and a number of address tag match circuitry 36aa–36ab and 36ba–36bb. Additionally, the DC 20 comprises a number of fill buffers 30, a writeback buffer 38, a snoop buffer 40, a selector/rotator 46, a number latches 42a–42k, and a number multiplexors 44a–44q. Furthermore, the DC 20 comprises two address input ports 46 and 48, one address output port 50, two data input ports 52 and 54, and two data output ports 56 and 58. These elements are coupled to each other as shown.

In one embodiment, the select/rotator 46 is coupled to the MIU of the EU 14 and the PMH 26 through a shared data return bus. Together, these elements cooperate to cache data from the memory unit 22 and respond to loads and stores in a non-blocking manner.

The cache data banks 34aa–34ad and 34ba–34bd store data currently being cached in the DC 20. The cache tag arrays 32a–32b store addresses and control information for the cache lines. The tag matching circuits 36aa–36ab and 36ba–36bb tag match the accessing addresses against the addresses output by the tag arrays 32a–32b.

The cache data banks 34aa–34ad and 34ba–34bd can be written into and read independently. The cache tag arrays 32a–32b can be accessed by two accessing addresses at the same time, and in like manner, the tag matching circuits 36aa–36ab and 36ba–36bb can perform tag matches for two accessing addresses at the same time.

The size of the cache data banks 34aa–34ad and 34ba–34bd is dependent on the size of a cache line, the number of cache lines in a set, and the number of sets. In one embodiment, the cache data banks 34aa–34ad and 34ba–34bd are sufficiently large to store 128 sets of 2 way associative 32 bytes cache lines. The size of the cache tag arrays 32a–32b is complementary to the cache data banks 34aa–34ad and 34ba–34bd.

As illustrated, the set select portion of a load address (LD PA[11:5]) is used to access the cache tag arrays 32a–32b, and the way select portion of the load address (LD PA[35:12]) is used by the tag matching circuits 36aa–36ab to perform tag matchings. The byte select portion of the load address is not shown, because it is used for data alignment only. Concurrently, the set select portion of either a store or a snoop address (ST/SNP PA[11:5]) is used to access the cache tag arrays 32a–32b, and the way select portion of the store/snoop address (ST/SNP PA[35:12]) is used by the tag matching circuits 36ba–36bb to perform tag matchings. Similarly, the byte select portion of the store address is not shown, because it is used for data alignment only.

The fill buffers 30 store cache lines currently being filled, respond to loads and stores that miss the cache data banks 36aa–36ab and 36ba–36bb and perform other functions, which will all be described in more detail below. The fill buffers 30 are preferably organized in a fully associative manner. One of fill buffers 30 is allocated for each cache fill. The allocation is made at the time the cache miss is encountered. To allocate, the fill buffers 30 are examined in a predetermined manner, such as circular, and the first free fill buffer 30 is chosen for allocation. At the completion of a cache fill, the content of the cache fill buffer 30 is output and written into one of the cache lines in the cache data banks 34aa–34ad and 34ba–34bd if the memory locations are cacheable and the cache fill buffer 30 was not snoop hit while the cache fill was in progress.

In the embodiment illustrated, there are four fill buffers 30. In other words, up to four cache fills can be in progress at the same time. The number of fill buffers 30 required to ensure their availability to serve cache misses is dependent on the frequency of cache misses, and the time required to perform a cache fill. Experience has shown that the number is a small number.

As will be explained in more detail below, the accessing load and the store/snoop addresses are also used to access the fill buffers 30 at the same time, in the event that the accessing load and store/snoop addresses miss the cache data banks 34aa–34ad and 34ba–34bd.

The selector/rotator 46 performs data selection and/or rotation on the data read out of either the cache data banks 34aa–34ad and 34ba–34bd or one of the fill buffers 30), aligning the data as appropriate before returning the output data to either the MIU of the EU 14, or the PMH 26, in response to a load operation.

The writeback and snoop buffers 38 and 40 store data being written back into the memory unit 22 as a result of a cache line being evicted and a cache snoop hit respectively. The writeback buffer 38 also stores the address of the cache line being evicted (PA[35:11]). While the DC 20 is basically a writeback cache, however, as will be explained in more detail below, through the multiprocessor cache coherency protocol MESI (Modified, Exclusive, Share & Invalid), the DC 20 can behave as if it is a write through cache for a selected subset of the memory locations.

Thus, in general, a load operation, and either a store or snoop operation can be serviced concurrently, except under certain circumstances, such as all four cache data banks 34aa–34ad or 34ba–34bd are being accessed for cache line replacement, or both the load and the store operations are against the same cache data bank 34aa, . . . or 34bd.

Referring now to FIGS. 4a–ab, an address path view and a data path view of the relevant portions of one embodiment of the fill buffers 30 of FIGS. 3a–3b are shown. As illustrated, the fill buffers 30 comprises a number of buffer slots 112a–112d, a number of tag matching circuits 114aa–114ad and 114ba–114bd, a number of address write selectors 116a–116d, a number of data write selectors 118aa–118ad, 118ba–118bd, 118ca–118cd, and 118da–118dd, and a number of multiplexors 120a–120c. Additionally, the fill buffers 30 have two address input ports 112a–112b, two address output ports 124a–124b, three data input ports 126a–126c, and one data output ports 128. These elements are coupled to each other as shown. Together, they hold a number of cache lines currently being filled, respond to loads and stores that miss the cache data banks 34aa–34ad and 34ba–34bd, and perform a number of other functions.

The buffer slots 112a–112d hold cache lines currently being filled, including their control and state information which will be described in more detail below. The tag matching circuits 114aa–114ad and 114ba–114bd address match the accessing addresses against the addresses output by the buffer slots 112a–112d.

Addresses can be written into the buffer slots 112a–112d independently. The address write selectors 116a–116d are independently controlled. Data, in data chunk granularity, can be written into the appropriate locations of the cache lines held in the buffer slots 112a–112d independently. The data write selectors 118aa–118ad, 118ba–118bd, 118ca–118cd, and 118da–118dd, are also independently controlled. Additionally, the buffer slots 112a–112d can be accessed by two accessing addresses at the same time, and in like manner, the tag matching circuits 114aa–114ad and 114ba–114bd can perform tag matches for two accessing addresses at the same time.

As illustrated, PA[35:5] of a load address is used by the tag matching circuits 114aa–114ad to tag match against the way and set select portions of the cache line addresses stored in the buffer slots 112a–112d. The byte select portion of the load address is not shown, because it is used for data alignment only. Concurrently, PA[35:5] of either a store or a snoop address is used by the tag matching circuits 114ba–114bd to tag match against the way and set select portions of the cache line addresses stored in the buffer slots 112a–112d. Similarly, the byte select portion of the store address is not shown, because it is used for data alignment only.

Each load or store that misses both the cache data banks 34aa–34ad and 34ba–34bd is allocated a buffer slot 112a, . . . or 112d. The load/store address is then provided to the memory unit 22 via the system bus through address output port 124b. Fill data from the memory unit 22, in data chunk granularity, are returned through the data input port 126c. Address and data of a fill completed replacement cache line are conditionally provided to the cache tag arrays 32a–32b and the cache data banks 34aa–34ad and 34ba–34bd through the address and data output ports 124a and 128 respectively. Store data of a store operation that misses the cache data banks 34aa–34ad and 34ba–34bd but hit one of the buffer slots 112a, . . . or 112d, in data chunk granularity, are written into the appropriate locations of the cache line held in one of the buffer slots 112a, . . . or 112d through the data input port 126b. Load data of a load operation that misses the cache data banks 34aa–34ad and 34ba–34bd but hit one of the buffer slots 112a, . . . or 112d are provided to the EU 14/PMH 26 through the data output port 128. Lastly, the data input port 126a is used to move data, in data chunk granularity, from the cache data banks 34aa–34ad and 34ba–34bd to the fill buffers 30, which will be described in more detail below.

In other words, the fill buffers 30 are provided with sufficient number of buffer slots 112a–112d, address and data input and output ports 122a–122b, 124a–124b, 126a–126c, and 128, address write selectors, 116a–116d, and data write selectors 118aa–118ad, 118ba–118bd, 118ca–118cd, and 118da–118dd, to allow the buffer slots 112a–112d to operate independently, and service multiple cache fills, loads, and stores/snoops concurrently. As a result, cache misses are handled by fill buffers 30 in a manner transparent to the cache tag arrays 32a–32b and cache data banks 34aa–34ad and 34ba–34bd, allowing the cache tag arrays 32a–32b and cache data banks 34aa–34ad and 34ba–34bd to serve subsequent loads and stores even with cache fills in progress, and without ever having to stall the EU 14.

Referring now to FIG. 5, a block diagram illustrating the relevant contents of one of the fill buffer slots 112a–112d of FIGS. 4a–4b is shown. As illustrated, each buffer slot 112a, . . . or 112d contains the cache line data being filled 130, the way, set, and byte select portions of the cache line address (PA[35:12], PA[11:5], and PA[4:0]) 132a–132c. Additionally, each buffer slot 112, . . . or 112d contains a number of control and state information for the cache fill in progress including an in-use bit 134a, a group of data chunk valid bits 134b, a group of data chunk request bits 134c, a group of byte written bits 134d, a globally observed bit 134e, a cache fill completion bit 134f, a data return bus grant bit 134g, a snoop freeze bit 134h, a replacement enabled bit 134i, and a system bus acknowledged bit 134j. Furthermore, each buffer slot 112, . . . or 112d contains a number of control and state information for a pending load being served including a group of cache line state bits 134k, an opcode 134l, a destination register identifier 134m, a forwardable bit 134n, a group of memory type bits 134o, a PMH data bit 134p, a write combine bit 134q, a first and a second misaligned load bit 134r and 134s.

The in-use bit 134a when set indicates that the buffer slot is currently in use. Each of the data chunk valid bits 134b when set indicates the corresponding data chunk is valid. Each data chunk request bit 134c when set indicates the corresponding data chunk contains data bytes requested by a pending load. Each byte written bit 134d when set indicates a data byte in the cache line is written by a store operation.

The system bus acknowledged bit 134*i* when set indicates that a request by the buffer slot 112*a*, . . . or 112*d* has been acknowledged by the system bus 24. The globally observed bit 134*e* when set indicates that a request by the buffer slot 112*a*, . . . or 112*d* has been globally observed in a multi-processor system. The cache fill completion bit 134*f* when set indicates that all cache fill data has been received. The snoop freeze bit 134*j* when set indicates the buffer slot 112*a*, . . . or 112*d* was hit by a snoop while the cache fill was in progress. The replacement enabled bit 134*h* when set indicates that the cache line is ready to be placed into the cache data banks 34*aa*–34*ad* and 34*ba*–34*bd*. The data return bus grant bit 134*g* when set indicates the buffer slot 112*a*, . . . or 112*d* has been granted the data return bus shared by the MIU of the EU 14 and the PMH 26.

The cache line state bits 134*k* indicate the current MESI state of the cache line. The opcode 134*l* describes the pending load operation. The register identifier 134*m* identifies the destination register of the EU 14. The forwardable bit 134*n* when set indicates the buffer slot 112*a*, . . . or 112*d* contains an access which must return data back to the EU 14 or the PMH 26. The memory type bits 134*o* identify the memory type of the source memory locations of the pending load. The PMH data bit 134*p* when set indicates that the pending load is for the PMH 26.

The write combine bit 134*q* when set indicates that the buffer slot 112*a*, . . . or 112*d* is being used as a write combining buffer for write combining store operations, which will be described in more detail below. Lastly, the first and the second misaligned load bits 134*r* and 134*s* when set indicate that the buffer slot 112*a*, . . . or 112*d* is being used as a staging buffer for the first and second aligned subset load operations of a misaligned load operation.

Figure 6B:
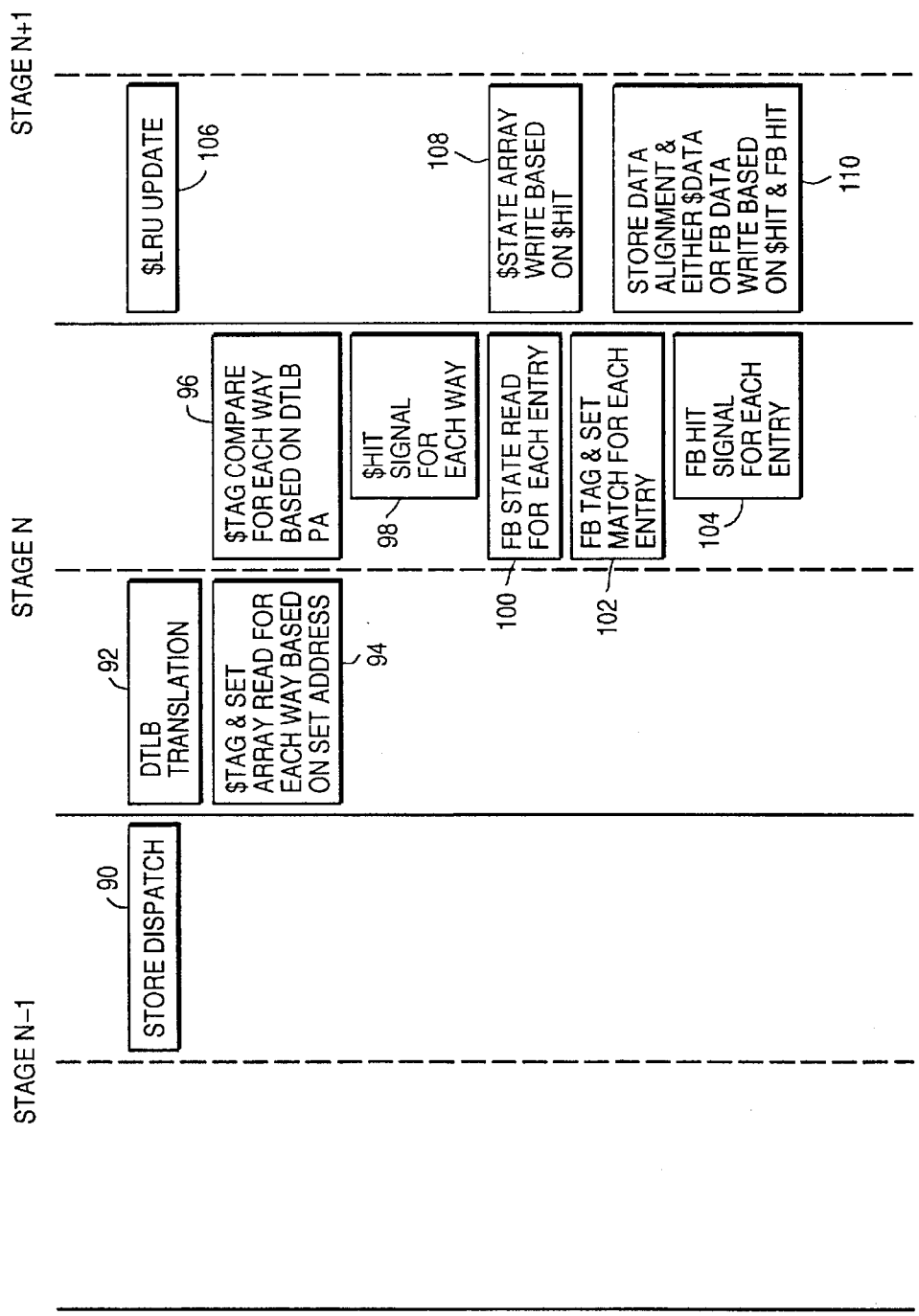

Referring now to FIGS. 6*a*–6*b*, two block diagrams illustrating the basic operational steps of the DC 20 of FIG. 2 for loading and storing data are shown. As illustrated in FIG. 6*a*, from dispatch to completion, a basic load takes three pipe stages to execute. During the later part of pipe stage n−1, the load operation is dispatched to the DTLB 28 and the DC 20, block 60. During the earlier part of pipe stage n, the LA of the load operation is translated into PA by the DTLB 28, block 62. Then, the cache tag arrays 32*a*–32*b* are accessed using PA[11:5], the set select portion of the load address, block 64. During the later part of pipe stage n, the addresses read out of the cache tag arrays 32*a*–32*b* are tag matched using PA[35:12], the way select portion of the load address, block 66. A cache hit/miss signal is generated for each way, block 68. Concurrently, the corresponding cache line for each way is read out of the cache data banks 34*aa*–34*ad* and 34*ba*–34*bd*, block 70.

In the meantime, the fill buffers 30 are accessed to read the states of the cache lines being filled to ensure they are all in valid states, block 72. The accessing PA[35:5] are matched against the way and select portions of the cache line address of each fill buffer 30, block 74. A fill buffer hit/miss signal is generated for each fill buffer 30, block 76. Lastly, during this period, the available data of each cache line being filled are read, block 78.

During the earlier part of pipe stage n+1, the LRU information in the cache tag array 32*a*–32*b* are updated accordingly, block 80. At the same time, data selection is made based on the cache and fill buffer hit results, block 82. Additionally, the selected data is rotated as appropriate, aligning the data being read out, block 84. Finally, at the later part of stage n+1, data conversion (such as floating point) is performed for the data being read out, block 86, and then returned to the EU 14 or the PMH 26, block 88. The data is returned to the PMH 26 if the load is issued by the PMH 26 as denoted by the setting of the PMH data bit 134*p*.

If the load operation misses the cache data banks 34*aa*–34*ad* and 34*ba*–34*bd*, but hits one of the fill buffers 30, however, the load data have not been returned from main memory 22 yet, the fill buffer slot 112*a*, . . . or 112*d* blocks the load operation, causing the load operation to be redispatched subsequently. If the load operation misses the cache data banks 34*aa*–34*ad* and 34*ba*–34*bd*, and the fill buffers 30, one of the fill buffer slots 112*a*–112*d* is allocated to handle the load cache miss. Handling of load cache misses will be described in more detail below. Thus, load cache misses are "absorbed" by the fill buffers 30, enabling the DC 20 to avoid having to stall processor execution because of a load cache miss.

As illustrated in FIG. 6*b*, from dispatch to completion, a basic store also takes three pipe stages to execute. During the later part of pipe stage n−1, the store operation is dispatched to the DTLB 28 and the DC 20, block 90. During the earlier part pipe stage n, the LA of the store operation is translated into PA by the DTLB 28, block 92. Then, the cache tag arrays 32*a*–32*b* are accessed using PA[11:5], the set select portion of the store address, block 94. During the later part of pipe stage n, the addresses read out of the cache tag arrays 32*a*–32*b* are tag matched using PA[35:12], the way select portion of the store address, block 96. A cache hit/miss signal is generated for each way, block 98.

In the meantime, the fill buffers 30 are accessed to read the states of the cache lines being filled to ensure they are in valid states, block 100. The accessing PA[35:5] are matched against the way and set select portions of the cache line address of each fill buffer 30, block 102. A fill buffer hit/miss signal is generated for each fill buffer 30, block 104.

During the earlier part of pipe stage n+1, the LRU and state information in the cache tag array 32*a*–32*b* are updated accordingly, blocks 106 and 108. Finally, at the later part of stage n+1, the store data are aligned and written into either one of the cache data banks 34*aa*–34*ad* and 34*ba*–34*bd*, or one of the fill buffers 30 based on the cache/fill buffer hit/miss signals, block 110. If the store data are written into one of the fill buffers 30, the byte written bits 134*d* and the cache line state bits 134*k* of the fill buffer slot 112*a*, . . . 112*d* are updated accordingly. The byte written bits 134*d* prevent the store data to be overwritten by subsequent returning cache fill data. The cache line state bits 134*k* allow cache coherency to be maintained for the cache line even while it is being filled. Thus, store cache misses are "absorbed" by the fill buffers 30, enabling the DC 20 to avoid having to stall processor execution because of a store cache miss.

Referring now to FIGS. 7*a*–7*b*, two block diagrams illustrating the operating states of one of the fill buffer slots 112*a*–112*d* of FIGS. 4*a*–4*b* during a load miss and a store miss are shown. As illustrated in FIG. 7*a*, initially a fill buffer slot 112*a*, . . . or 112*d* is in an available state 136. The fill buffer slot 112*a*, . . . 112*d* remains in the available state 136, until it is allocated to a cache fill in response to a load miss. Upon allocation, the fill buffer slot 112*a*, . . . or 112*d* sets the in-use bit 134*a* denoting its allocation, updates the way, set, and byte select portion of the cache line address 132*a*–132*c*, and other application control and state information, makes a bus request for the cache line data, and enters a waiting for acknowledgment state 138.

The fill buffer slot 112*a*, . . . or 112*d* remains in the waiting for acknowledgment state 136, until the bus request is acknowledged. Upon acknowledgment, the fill buffer slot 112a, . . . 112d sets the acknowledgment bit 134i, and enters a waiting for global observation state 140. The fill buffer slot 112a, . . . 112d remains in the waiting for global observation state 140, until informed by the bus that its request has been globally observed. Upon being so informed, the fill buffer slot 112a, . . . 112d sets the globally observed bit 134e, and enters a waiting for requested data state 142.

The fill buffer slot 112a, . . . 112d remains in the waiting for request data state 142, until the first chunk of the requested data returns. Upon receiving the first chunk of the requested data, the fill buffer slot 112a, . . . 112d writes the data 130 and sets the chunk valid bits 134b accordingly if there has not been a subsequent store operation writing data into the same memory locations (the store operation would have hit and stored the data into the fill buffer slot). Additionally, the fill buffer slot 112a, . . . 112d arbitrates for the data return bus, and enters a waiting for data return bus grant state 144. In the presently preferred embodiment, the first chunk of the requested data is the critical chunk. The fill buffer slot 112a, . . . or 112d remains in the waiting for the data return bus grant state 144, until its request for the data return bus is granted. Upon granting the data return bus, the fill buffer slot 112a, . . . or 112d sets the data return bus grant bit 134g, and enters a data return state 146. Data are returned to either the EU 14 or the PMH 26. If the data is returned to the PMH 26, the fill buffer slot 112a, . . . 112d also signals the PMH 26. The fill buffer slot 112a, . . . 112d remains in the data return state 146, until the data return is completed. Upon completing the data return, the fill buffer slot 112a, . . . or 112d enters a waiting for the rest of the requested data state 148.

The fill buffer slot 112a, . . . 112d remains in the waiting for the rest of the requested data state 148, until all data chunks have been returned. As the data chunks are returned, the appropriate chunk valid bits 134b are updated. Upon receiving the rest of the requested data, the fill buffer slot 112a, . . . 112d enters a waiting for read complete state 150. The fill buffer slot 112a, . . . 112d remains in the waiting for read complete state 150, until read complete is signaled. Upon being signaled, the fill buffer slot 112a, . . . 112d conditionally enters a waiting for replacement state 152 if the cache fill completed cache fill is to be output for the cache data banks 34aa–34ad and 34ba–34bd. The fill completed cache line is to be output for the cache data banks 34aa–34ad and 34ba–34bd if the memory locations are cacheable and the cache line was not snoop hit while the cache fill was in progress. The cacheability of the memory locations are denoted by the memory type 134o. As described earlier, snoop hit is denoted by the snoop freeze bit 134j. If the fill completed cache line is not output for the cache data banks 34aa–34ad and 34ba–34bd, it is subsequently read and handled by the bus controller 16 in due course. Upon completion of the replacement, the fill buffer slot 112a, . . . 112d resets the in-use bit 134a, effectively deallocating itself, and returns to the available state 136.

As illustrated in FIG. 7b, initially a fill buffer slot 112a, . . . 112d is in an available state 156. The fill buffer slot 112a, . . . 112d remains in the available state 156, until it is allocated to a cache fill in response to a store miss. Upon allocation, the fill buffer slot 112a, . . . 112d sets the in-use bit 134a denoting its allocation, writes the data 130, updates the byte written bits 134d, the way, set, and byte select portion of the cache line address 132a–132c etc., makes a bus request for the cache line data, and enters a waiting for acknowledgment state 158.

The fill buffer slot 112a, . . . 112d remains in the waiting for acknowledgment state 136, until the bus request is acknowledged. Upon acknowledgment, the fill buffer slot 112a, . . . 112d sets the acknowledgment bit 134i, and enters a waiting for global observation state 160. The fill buffer slot 112a, . . . 112d remains in the waiting for global observation state 160, until informed by the bus that its request has been globally observed. Upon being so informed, the fill buffer slot 112a, . . . 112d sets the globally observed bit 134e, and enters a waiting for all requested data to complete state 162.

As the requested data return, the fill buffer slot 112a, . . . or 112d stores the data 130 and sets the chunk valid bits 134b accordingly if the returning data are not for memory locations masked by the byte written bits 134d, i.e. memory locations written by the missed or subsequent store operations. The fill buffer slot 112a, . . . or 112d remains in the waiting for all requested data to complete state 162, until all requested data are returned by the memory unit 22. Upon receiving all requested data, the fill buffer slot 112a, . . . 112d enters a waiting for read complete state 164. The fill buffer slot 112a, . . . 112d remains in the waiting for read complete state 164, until read complete is signaled. Upon being signaled, the fill buffer slot 112a, . . . 112d enters a waiting for replacement state 166. The filled completed cache line is to be output for the cache data banks 34aa–34ad and 34ba–34bd if the memory locations are cacheable and the cache line was not snoop hit while the cache fill was in progress. The cacheability of the memory locations are denoted by the memory type 134o. As described earlier, snoop hit is denoted by the snoop freeze bit 134j. If the fill completed cache line is not output for the cache data banks 34aa–34ad and 34ba–34bd, it is subsequently read and handled by the bus controller 16 in due course. Upon completion of the replacement, the fill buffer slot 112a, . . . or 112d resets the in-use bit 134a, effectively deallocating itself, and returns to the available state 156.

Referring now to FIG. 8, a block diagram illustrating the operational steps of one of the fill buffer slots 112a–112d of FIGS. 4a–4b for replacing a cache line is shown. As illustrated, the cache line replacement operation takes three pipe stages to complete. In the early part of pipe stage n–1, the fill buffer slot 112a, . . . 112d issues the replacement request, block 170. Concurrently, the replacement cache line's addresses are output for the cache tag arrays 32a–32b, block 172.

After issuing the replacement request, the fill buffer slot 112a, . . . or 112d will proceed if no load or store is dispatched during the later part of stage n–1. Otherwise, the fill buffer slot 112a, . . . 112d will wait for such condition to be met, unless the fill buffer slots 112a, . . . 112d are all used. In that event, any load or store issued will be blocked by the fill buffer slot 112a, . . . 112d with the outstanding replacement request, causing the load or store operation to be redispatched at a later time. In the presently preferred embodiment, only one replacement request can be outstanding at any point in time.

Then, in the early part of pipe stage n, the cache tag arrays 32a–32b are read for replace way selection based on the way select portion of the cache line address output for the replace request, block 176. Concurrently, the cache tag arrays 32a–32b are read for state and LRU information for replace set selection, blocks 178–180. During the later part of pipe stage n, the addresses of the cache line being evicted are written into the writeback buffer 38, block 182; concurrently, the replacement cache line's address are written into the cache tag arrays 32a–32b, block 184. Similarly, the data of the cache line being evicted are read out of the cache data banks 34aa–34ad and 34ba–34bd, block 186; concurrently, the replacement cache line's data and state are read out of the fill buffer slot 112a, . . . 112d. Finally, in the early part of pipe stage n+1, the data being read out of the cache data banks 34aa–34ad and 34ba–34bd are written into the write buffer 38, block 186; concurrently, the replacement cache line's data and state being read out of the fill buffer slot 112a, or 112d are written into the cache data banks 34aa–34ad and 34ba–34bd.

Referring now to FIGS. 9–10, two block diagrams illustrating the operational steps of a fill buffer slot 112a, . . . 112d of FIGS. 4a–4b for application to two non-cache fill but related functions are shown. FIG. 9 illustrates the operational steps for servicing the aligned subset load operations of a misaligned load operation, whereas, FIG. 10 illustrates the operational steps for servicing a sequence of write combining store operations.

As described earlier, load and store operations are not required to be directed against data boundary aligned memory locations. Load and store operations may be data chunk misaligned, cache line misaligned, and memory page misaligned. For cache line/memory page misaligned load/store operations, they are dispatched as aligned subset load/store operations. In particular, in one embodiment, the misaligned load/store operation is dispatched as a first and a second aligned subset load/store operation. For a more detailed description of loading and storing misaligned data, see the above identified U.S. Patent Application incorporated by reference.

The fill buffers 30 handle the separate dispatching of the aligned subset store operations as if they are distinct store operations, no other special handling is required. As illustrated in FIG. 9, for the separately dispatched aligned subset load operations, if the first aligned subset load operation hits the cache data banks 34aa–34ad, and 34ba–34bd, a first fill buffer slot 112a, . . . or 112d is allocated. Additionally, the split first bit 134r is set, data are moved from the cache data banks 34aa–34ad, and 34ba–34bd to the allocated fill buffer slot 112a, . . . 112d, and the data are marked as "invalid". Block 196.

If the second aligned subset load operation also hits the cache data banks 34aa–34ad, and 34ba–34bd, the corresponding data are mad out of the cache data banks 34aa–34ad, and 34ba–34bd and the allocated fill buffer slot 112a, . . . or 112d, combined, written back to the EU 14 or the PMH 25. The fill buffer slot 112a, . . . or 112d is then deallocated. Block 200.

However, if the second aligned subset load operation misses the cache data banks 34aa–34ad, and 34ba–34bd, a second fill buffer slot 112a, . . . or 112d is allocated, and the missed data is requested. Block 202. When the requested data return, the appropriate data are read out of the first allocated fill buffer slot 112a, . . . 112d and combined with the returning data. The combined data are then written back to the EU 14 or the PMH 26, and the first fill buffer slot 112a, . . . 112d is deallocated. Block 204. Finally, after all requested data have been returned, if the memory locations are cacheable and the cache line has not been snoop hit while the cache fill is in progress, cache line replacement as described earlier is performed. Block 206.

On the other hand, if the first aligned subset load operation misses the cache data banks 34aa–34ad, and 34ba–34bd, a first fill buffer slot 112a, . . . or 112d is allocated, and the missed data are requested. Block 208.

If the second aligned subset load operation hits the cache data banks 34aa–34ad, and 34ba–34bd, a second fill buffer slot 112a, . . . or 112d is allocated. Additionally, the split second bit 134r is set, data are moved from the cache data banks 34aa–34ad, and 34ba–34bd to the allocated fill buffer slot 112a, . . . 112d, and the data are marked as "invalid". Block 212.

When the requested data for the first allocated fill buffer 112a, . . . or 112d return, the corresponding data are read out of the second allocated fill buffer slot 112a, . . . 112d, combined with the returning data, and written back to the EU 14 or the PMH 25. The second fill buffer slot 112a, . . . 112d is then deallocated. Block 214. Finally, after all requested data have been returned, if the memory locations are cacheable and the cache line has not been snoop hit while the cache fill is in progress, cache line replacement as described earlier is performed, block 216.

However, if the second aligned subset load operation also misses the cache data banks 34aa–34ad, and 34ba–34bd, a second fill buffer slot 112a, . . . 112d is allocated, and the missed data is requested. Block 218. When the requested data return, the appropriate data are read out of the first allocated fill buffer slot 112a, . . . or 112d, combined with the returning data, and written back to the EU 14 or the PMH 26. Block 220. Finally, after all requested data have been returned, for each cache line, if the memory locations are cacheable and the cache line has not been snoop hit while the cache fill is in progress, cache line replacement as described earlier is performed. Block 220. Cache line replacement for the two allocated fill buffer slots 112a, . . . or 112d are independently determined and performed.

Write combining store operations are extensions of the standard store operations for string move, string copy, bit bit operations in graphics applications. Since a large number of read-for-ownership cache line fills resulted from a large number of store operations is a significant burden and waste of the bus bandwidth, it is more advantageous to collect the store operations having the same "cache line" addresses, i.e., the higher order bits, regardless whether the destination memory locations are cacheable or not, and combine them before writing them back into the memory unit 22 as a single store operation.

As illustrated in FIG. 10, when a first of these write combining store operations misses the cache data banks 34aa–34ad and 34ba–34bd, a fill buffer slot 112a, . . . or 112d is allocated. Block 224. The write combining nature of the store operation is inferred from the instruction opcode or memory type. The store data are written into the allocated fill buffer slot 112a, . . . 112d. Block 226. The store data of write combining store operations that hit the cache data banks 34aa–34ad and 34ba–34bd are written into the cache data banks 34aa–34ad and 34ba–34bd.

In the presently preferred embodiment, only one logical write combining buffer is supported. If a second one is needed, the first one is evicted and allocated for the second sequence of write combining store operations. Thus, upon writing the store data of the first encountered write combining store operation, the allocated fill buffer slot 112a, . . . 112d writes the store data of the subsequent write combining store operations having the same "cache line" addresses, as long as the allocated fill buffer slot 112a, . . . 112d is not being evicted for other usages. Blocks 226–230.

When all bytes of the "cache line" being held have been written, and the memory locations are cacheable and haven't been snoop hit, the fill buffer slot 112a, . . . or 112d writes the data back into the cache data banks 34aa–34ad and 34ba–34bd through a cache line replacement operation as described above. Block 236. Additionally, the fill buffer slot 112a, . . . 112d causes an l to M cache state transition bus transaction to be performed. Block 236. If all bytes of the "cache line" being held have been written and the memory locations are non-cacheable, the fill buffer slot 112a, ... 112d writes the data back into the memory unit 22 as described above. Block 238.

However, if all bytes of the "cache line" being held have not been written, i.e. the write combine buffer is being evicted, but the memory locations are cacheable and haven't been snoop hit, the fill buffer slot 112a, ... 112d performs a read-for-ownership and then writes the data back into the cache data banks 34aa–34ad and 34ba–34bd through a cache line replacement operation as described above. Block 242. Finally, if all bytes of the "cache line" being held have not been written, but the memory locations are not cacheable, the fill buffer slot 112a, ... 112d writes the data back into the memory unit 22 as described above. Block 244.

While the present invention has been described in terms of the illustrated embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus for caching data in a non-blocking manner comprising:
    a) a first plurality of cache data banks for storing a first plurality of cache lines of cache data;
    b) first cache tag array and matching circuitry for storing a first plurality of cache line addresses for said first plurality of cache lines, and for tag matching a load address of a load operation against said first plurality of cache line addresses to determine if said load operation hits one of said first plurality of cache lines; and
    c) a plurality of fill buffers that stage data to be placed in one of said first plurality of cache data banks, said data staged by said plurality of fill buffers not necessarily to be stored in sequential cache lines, said plurality of fill buffers being coupled to said first plurality of cache data banks and said first cache tag array and matching circuitry and being configured to replace one of said first plurality of cache lines whenever the filling of one of said plurality of fill buffers is completed,
    wherein if said load operation misses all of said first plurality of cache lines and hits one of said plurality of fill buffers, then said one of said fill buffers outputs load data for said load operation, and if said load operation misses all of said first plurality of cache lines and all of said plurality of fill buffers, then one of said plurality of fill buffers stages data to be stored in said plurality of cache data banks as data corresponding to said load operation; and
        wherein the plurality of fill buffers are configured concurrently to stage data to be placed in one of said plurality of cache data banks, and to replace one of said first plurality of cache lines.

2. The apparatus as set forth in claim 1, wherein, said fill buffers determine whether said load operation hits one of said plurality of fill buffers concurrently with said cache hit determination performed by said first cache tag array and matching circuitry.

3. The apparatus as set forth in claim 1, wherein, said apparatus further comprises:
    d) an address input port coupled to said first cache tag array and matching circuitry and said fill buffers for providing said first cache tag array and matching circuitry and said fill buffers with said load address; and
    e) an address output port coupled to said fill buffers for outputting said load address when said load address misses said plurality of fill buffers as well as said first plurality of cache lines.

4. The apparatus as set forth in claim 1, wherein, said apparatus further comprises:
    d) a data input port coupled to said fill buffers for providing cache fill data to said fill buffers;
    e) a first data output port coupled to said first plurality of cache data banks and said fill buffers for outputting load data from a selected one of said first plurality of cache data banks and said fill buffers if said load operation hits one of said first plurality of cache lines and said fill buffers; and
    f) a second data output port coupled to said first plurality of cache data banks and said fill buffers for outputting writeback data from said first plurality of cache data banks if one of said first plurality of cache lines is evicted, and from said fill buffers if data staged therein is not eligible to replace one of said first plurality of cache lines.

5. The apparatus as set forth in claim 1, wherein,
    said first plurality of cache data banks further merge store data of a store operation into one of said first plurality of cache lines if said store operation hits one of said first plurality of cache lines;
    said first cache tag array and matching circuitry further tag matches a store address of said store operation against said first plurality of cache line addresses to determine whether said store operation hits one of said first plurality of cache lines; and
    said fill buffers further concurrently handles said store operation if said store operation misses all of said first plurality of cache lines.

6. The apparatus as set forth in claim 5, wherein, if said store operation misses all of said first plurality of cache lines,
    one of said fill buffers merges said store data of said store operation into a missed cache line being filled if said store operation hits the missed cache line being filled; and
    said fill buffers allocate one of its fill buffers to stage the missed cache line to be filled if said store operation also misses all of said missed cache lines being filled.

7. The apparatus as set forth in claim 6, wherein, said fill buffers determine whether said store operation hits the missed cache line being filled concurrent with said cache hit determination performed by said first cache tag array and matching circuitry.

8. The apparatus as set forth in claim 5, wherein, said apparatus further comprises:
    d) an address input port coupled to said first cache tag array and matching circuitry and said fill buffers for providing said first cache tag array and matching circuitry and said fill buffers with one of said load and store addresses; and
    e) an address output port coupled to said fill buffers for outputting one of said load and store addresses when one of the load and store addresses misses a missed cache lines being filled as well as said first plurality of cache lines.

9. The apparatus as set forth in claim 5, wherein, said apparatus further comprises:
    d) a data input port coupled to said first plurality of cache data banks and said fill buffers for providing either said store data to a selected one of said first plurality of cache data banks and said fill buffers, or said cache fill data to said fill buffers;

e) a first data output port coupled to said first plurality of cache data banks and said fill buffers for outputting said load data from a selected one of said first plurality of cache data banks and said fill buffers if said load operation hits one of said first plurality of cache lines and a missed cache line being filled; and f) a second data output port coupled to said first plurality of cache data banks and said fill buffers for outputting writeback data from said first plurality of cache data banks if one of said first plurality of cache lines is evicted, and from said fill buffers if a fill completed missed cache line is not eligible to replace one of said first plurality of cache lines.

10. The apparatus as set forth in claim 5, wherein, said apparatus further comprises:

d) a first address input port coupled to said first cache tag array and matching circuitry and said fill buffers for providing said first cache tag array and matching circuitry and said fill buffers with said load address;

e) a second address input port coupled to said first cache tag array and matching circuitry and said fill buffers for providing said first cache tag array and matching circuitry and said fill buffers with said store address; and f) an address output port coupled to said fill buffers for outputting one of said load and store addresses when one of said load and store addresses misses a missed cache line being filled as well as said first plurality of cache lines.

11. The apparatus as set forth in claim 5, wherein, said apparatus further comprises:

d) a first data input port coupled to said first plurality of cache data banks and said fill buffers for providing said store data to a selected one of said first plurality of cache data banks and said fill buffers;

e) a second data input port coupled to said fill buffers for providing said cache fill data to said fill buffers;

f) a first data output port coupled to said first plurality of cache data banks and said fill buffers for outputting said load data from a selected one of said first plurality of cache data banks and said fill buffers if said load operation hits one of said first plurality of cache lines and missed cache lines being filled;

g) a second data output port coupled to said first plurality of cache data banks and said fill buffers for outputting writeback data from said first plurality of cache data banks if one of said first plurality of cache lines is evicted and from said fill buffers if a fill completed missed cache line is not eligible to replace one of said first plurality of cache lines.

12. The apparatus as set forth in claim 5, wherein, said fill buffers further stage write combining data of a sequence of write combining store operations.

13. The apparatus as set forth in claim 5, wherein, said fill buffers further stage a first of a sequence of two aligned subset store operations dispatched for a misaligned store operation.

14. The apparatus as set forth in claim 5, wherein, said fill buffers further stage a second of a sequence of two aligned subset store operations dispatched for a misaligned store operation.

15. The apparatus as set forth in claim 1, wherein, said apparatus further comprises:

d) a second plurality of cache data banks for storing a second plurality of cache lines of cache data, and conditionally outputting one of said second plurality of cache lines of cache data in response to said load address of said load operation; and e) second cache tag array and matching circuitry for storing a second plurality of cache line addresses for said second plurality of cache lines, and tag matching said load address against said second plurality of cache line addresses to determine if said load operation hits one of said second plurality of cache lines.

16. The apparatus as set forth in claim 15, wherein, if said load operation misses all of said first and second plurality of cache lines, one of said fill buffers outputs load data for said load operation if said load operation hits one of said missed cache lines being filled; and said fill buffers allocate one of its fill buffers to stage the missed cache line to be filled if said load operation also misses all of said missed cache lines being filled.

17. The apparatus as set forth in claim 16, wherein, said fill buffers determine whether said load operation hits one of said missed cache lines being filled concurrent with said cache hit determination performed by said first and second cache tag arrays and matching circuitry.

18. The apparatus as set forth in claim 15, wherein, said apparatus further comprises:

f) an address input port coupled to said first and second cache tag array and matching circuitry and said fill buffers for providing said first and second cache tag arrays and matching circuitry and said fill buffers with said load address;

g) an address output port coupled to said fill buffers for outputting said load address when said load address misses said missed cache lines being filled as well as said first and second plurality of cache lines.

19. The apparatus as set forth in claim 15, wherein, said apparatus further comprises:

f) a data input port coupled to said fill buffers for providing cache fill data to said fill buffers;

g) a first data output port coupled to said first and second plurality of cache data banks and said fill buffers for outputting said load data from a selected one of said first and second plurality of cache data banks and said fill buffers if said load operation hits one of said first and second plurality of cache lines and missed cache lines being filled; and h) a second data output port coupled to said first and second plurality of cache data banks and said fill buffers for outputting writeback data from said first and second plurality of cache data banks if one of said first and second plurality of cache lines is evicted, and from said fill buffers if a fill completed missed cache line is not eligible to replace one of said first and second plurality of cache lines.

20. The apparatus as set forth in claim 15, wherein, said first and second plurality of cache data banks further merge store data of a store operation into one of said first and second plurality of cache lines if said store operation hits one of said first and second plurality of cache lines;

said first and second cache tag arrays and matching circuitry further tag match a store address of said store operation against said first and second plurality of cache line addresses respectively to determine whether said store operation hits one of said first and second plurality of cache lines; and said fill buffers further concurrently handles said store operation if said store operation misses all of said first and second plurality of cache lines.

21. The apparatus as set forth in claim 20, wherein, if said store operation misses all of said first and second plurality of cache lines, one of said fill buffers merges said store data of said store operation into one of said missed cache lines being filled if said store operation hits one of said missed cache line being filled; and said fill buffers allocate one of its fill buffers to stage the missed cache line to be filled if said store operation also misses all of said missed cache lines being filled.

22. The apparatus as set forth in claim 21, wherein, said fill buffers determine whether said store operation hits one of said missed cache lines being filled concurrent with said cache hit determination performed by said first and second cache tag array and matching circuitry.

23. The apparatus as set forth in claim 20, wherein, said apparatus further comprises:

f) an address input port coupled to said first and second cache tag array and matching circuitry and said fill buffers for providing said first and second cache tag array and matching circuitry and said fill buffers with one of said load and store addresses;

g) an address output port coupled to said fill buffers for outputting one of said load and store addresses when one of the load and store addresses misses said missed cache lines being filled as well as said first plurality of cache lines.

24. The apparatus as set forth in claim 20, wherein, said apparatus further comprises:

f) a data input port coupled to said first and second plurality of cache data banks and said fill buffers for providing either said store data to a selected one of said first and second plurality of cache data banks and said fill buffers, or said cache fill data to said fill buffers;

g) a first data output port coupled to said first plurality of cache data banks and said fill buffers for outputting said load data from a selected one of said first and second plurality of cache data banks and said fill buffers if said load operation hits one of said first and second plurality of cache lines and missed cache lines being filled;

h) a second data output port coupled to said first and second plurality of cache data banks and said fill buffers for outputting writeback data from said first and second plurality of cache data banks if one of said first and second plurality of cache lines is evicted, and from said fill buffers if a fill completed missed cache line is not eligible to replace one of said first and second plurality of cache lines.

25. The apparatus as set forth in claim 20, wherein, said apparatus further comprises:

f) a first address input port coupled to said first and second cache tag array and matching circuitry and said fill buffers for providing said first and second cache tag array and matching circuitry and said fill buffers with said load address;

e) a second address input port coupled to said first and second cache tag array and matching circuitry and said fill buffers for providing said first and second cache tag array and matching circuitry and said fill buffers with said store address;

f) an address output port coupled to said fill buffers for outputting one of said load and store addresses when one of said load and store addresses misses said missed cache lines being filled as well as said first and second plurality of cache lines.

26. The apparatus as set forth in claim 20, wherein, said apparatus further comprises:

f) a first data input port coupled to said first and second plurality of cache data banks and said fill buffers for providing said store data to a selected one of said first and second plurality of cache data banks and said fill buffers;

g) a second data input port coupled to said fill buffers for providing said cache fill data to said fill buffers;

h) a first data output port coupled to said first and second plurality of cache data banks and said fill buffers for outputting said load data from a selected one of said first and second plurality of cache data banks and said fill buffers if said load operation hits one of said first and second plurality of cache lines and missed cache lines being filled;

i) a second data output port coupled to said first and second plurality of cache data banks and said fill buffers for outputting writeback data from one of said first and second plurality of cache data banks if one of said first and second plurality of cache lines is evicted, and from said fill buffers if a fill completed missed cache line is not eligible to replace one of said first and second plurality of cache lines.

27. A method for caching data in a non-blocking manner comprising the steps of:

a) storing a first plurality of cache lines of cache data and a first plurality of corresponding cache line addresses in a first plurality of cache data banks and a first cache tag array respectively, and staging a plurality of non-sequential missed cache lines of cache fill data within a plurality of fill buffers that store one of said first plurality of cache lines of cache data prior to storing in a cache memory;

b) replacing one of said first plurality of cache lines whenever the filling of one of said staged cache lines is completed;

c) tag matching a load address of a load operation against said first plurality of cache line addresses with first tag matching circuitry to determine if said load operation hits one of said first plurality of cache lines, and tag matching said load address against cache line addresses of said missed cache lines being filled with second tag matching circuitry to determine if said load operation hits one of said plurality of fill buffers, said tag matchings being performed concurrently with said staging in step (a) and said replacement in step (b);

d) outputting load data for said load operation from one of said first plurality of cache lines and said plurality of fill buffers based on the results of said tag matchings in step (c), said outputting being performed, concurrently with said staging in step (a) and said replacement in step (b); and e) allocating one of said fill buffers to stage the missed cache line of cache data prior to storing said cache line of cache data in said plurality of cache data banks if said load operation misses all of said first plurality of cache lines and all of said plurality of fill buffers.

28. The method as set forth in claim 27, wherein, said step (c) further comprises tag matching a store address of a store operation against said first plurality of cache line addresses with said first tag matching circuitry to determine whether said store operation hits one of said first plurality of cache lines, and tag matching said store address against said cache line addresses of said missed cache lines being filled with said second tag matching circuitry to determine whether said store operation hits one of said missed cache lines being filled, said tag matching of said store address being also performed, if necessary, concurrent with said tag matchings of said load address, said staging in step (a), and said replacement in said step (b); and said step (d) further comprises merging store data of said store operation into one of said first plurality of cache lines and said missed cache lines being filled based on the results of said store address tag matchings in said step (c), said merging being performed, if necessary, concurrent with said tag matchings of said load address, said staging in step (a), and said replacement in said step (b).

29. The method as set forth in claim 28, wherein, said method further comprises the step of:

e) allocating one of said fill buffers to stage the missed cache line to be filled if said store operation misses all of said first plurality of cache lines and said missed cache lines being filled.

30. The method as set forth in claim 27, wherein, said step (a) further comprises storing a second plurality of cache lines of cache data and a second plurality of cache line addresses in a second plurality of cache data banks and a second cache tag array respectively;

said step (c) further comprises tag matching said load address against said second plurality of cache line addresses with third cache tag matching circuitry to determine if said load operation hits one of said second plurality of cache lines; and said outputting in step (d) is further based on the results of said tag matchings against said second plurality of cache line addresses, and possibly from one of said second plurality of cache lines.

31. The method as set forth in claim 30, wherein, said method further comprises the step of:

e) allocating one of said fill buffers to stage the missed cache line to be filled if said load operation misses all of said first and second plurality of cache lines as well as said missed cache lines being filled.

32. The method as set forth in claim 30, wherein, said step (c) further comprises tag matching a store address of a store operation against said first and second plurality of cache line addresses as well as said cache line addresses of said missed cache lines being filled with said first, third, and second cache tag matching circuitry respectively to determine if said store operation hits one of said first and second plurality of cache lines and said missed cache lines being filled;

said step (d) further comprises merging store data of said store operation into one of said first and second plurality of cache lines and said missed cache lines being filled based on the results of said store address tag matchings in said step (c), said merging being performed, if necessary, concurrent with said staging in step (a) and said replacement in step (b).

33. The method as set forth in claim 32, wherein, said method further comprises the step of:

e) allocating one of said fill buffers to stage the missed cache line to be filled if said store operation misses all of said first and second plurality of cache lines as well as said missed cache lines being filled.

34. A processor comprising:

an instruction fetch and dispatch unit that fetches and dispatches instructions;

an execution unit coupled to said instruction fetch and dispatch unit that executes said instructions; and a non-blocking cache memory coupled to said execution unit that caches data in a non-blocking manner for said execution unit, said non-blocking cache memory having a plurality of data banks that store a plurality of cache lines of cache data, cache tag array and matching circuitry that stores cache line addresses corresponding to said cache lines of cache data and that tag matches memory accessing addresses of memory access operations to said cache line addresses, and a plurality of fill buffers that store non-sequential cache lines of cache data and that are configured concurrently to stage a first missed cache line, to replace a cache line in said data banks upon completion of a second missed cache line of cache data being loaded into one of said plurality of fill buffers, and to output a third cache line located in said fill buffers.

35. The processor as set forth in claim 34, wherein, said processor is an out-of-order execution processor;

said execution unit is an out-of-order execution unit;

said processor further comprises memory order buffer circuitry coupled to said out-of-order execution unit and said non-blocking cache memory that buffers load and store operations, and maintaining memory order.

36. The processor as set forth in claim 34, wherein said processor is disposed on a single silicon based integrated circuit.

37. A computer system comprising:

a memory unit that stores instruction and data;

an instruction fetch and dispatch unit coupled to said memory unit that fetches and dispatches instructions;

a non-blocking cache memory coupled to said memory unit that caches data in a non-blocking manner for said execution unit, said non-blocking cache memory having a plurality of data banks that store a plurality of cache lines of cache data, cache tag array and matching circuitry that stores cache line addresses corresponding to said cache lines of cache data and that tag matches memory accessing addresses of memory access operations to said cache line addresses, and a plurality of fill buffers that store non-sequential cache lines of cache data and that are configured concurrently to stage a first missed cache line, to replace a cache line in said data banks upon completion of a second missed cache line of cache data being loaded into one of said plurality of fill buffers, and to output a third cache line located in said fill buffers; and an execution unit coupled to said instruction fetch and dispatch unit that executes said instructions.

38. The computer system as set forth in claim 37, wherein, said computer system is an out-of-order execution computer system;

said execution unit is an out-of-order execution unit;

said computer system further comprises memory order buffer circuitry coupled to said out-of-order execution unit and said non-blocking cache memory that buffers load and store operations, and maintains memory order.

39. A non-blocking cache memory that caches data in a non-blocking manner, said non-blocking cache memory comprising:

a plurality of data banks configured to store a plurality of cache lines of cache data;

cache tag array and matching circuitry configured to store cache line addresses corresponding to said cache lines of cache data stored in said plurality of data banks, and to tag match memory accessing addresses of memory access operations to said cache line addresses; and a plurality of fill buffers configured to store non-sequential cache lines of cache data and concurrently to:

(a) stage a first missed cache line of cache data;

(b) replace a cache line in said plurality of data banks upon completion of a second missed cache line of cache data being loaded into one of said plurality of fill buffers; and (c) output a third cache line of cache data located in said fill buffers and addressed by a load operation.

* * * * *